United States Patent
Schad et al.

(10) Patent No.: US 9,090,011 B2
(45) Date of Patent: Jul. 28, 2015

(54) TWO STAGE INJECTION UNIT ROTARY VALVE

(71) Applicant: Athena Automation Ltd., Vaughan (CA)

(72) Inventors: Robert D. Schad, Vaughan (CA); Stephen Mracek, Oakville (CA); Ivan Nikolaev, Richmond Hill (CA)

(73) Assignee: ATHENA AUTOMATION LTD., Vaughan (CA)

( * ) Notice: Subject to any disclaimer, the term of this patent is extended or adjusted under 35 U.S.C. 154(b) by 0 days.

(21) Appl. No.: 14/486,534

(22) Filed: Sep. 15, 2014

(65) Prior Publication Data
US 2015/0079221 A1    Mar. 19, 2015

Related U.S. Application Data

(60) Provisional application No. 61/877,554, filed on Sep. 13, 2013.

(51) Int. Cl.
 *B29C 45/23* (2006.01)
 *B29C 45/18* (2006.01)
 *B29L 31/00* (2006.01)
 *B29C 45/54* (2006.01)

(52) U.S. Cl.
 CPC ............... *B29C 45/18* (2013.01); *B29C 45/54* (2013.01); *B29L 2031/757* (2013.01)

(58) Field of Classification Search
 USPC ............................ 425/557, 558, 559, 560, 561
 See application file for complete search history.

(56) References Cited

U.S. PATENT DOCUMENTS

| | | | |
|---|---|---|---|
| 3,135,293 A | 6/1964 | Hulsey | |
| 3,233,865 A | 2/1966 | Panzica et al. | |
| 4,054,273 A | 10/1977 | Neuman | |
| 4,557,683 A | 12/1985 | Meeker et al. | |
| 4,983,117 A | 1/1991 | von Buren et al. | |
| 5,035,605 A | 7/1991 | Dinerman et al. | |
| 5,108,075 A | 4/1992 | Downard et al. | |
| 5,380,184 A | 1/1995 | Von Holdt, Sr. | |
| 5,605,707 A * | 2/1997 | Ibar | 425/557 |
| 5,814,358 A * | 9/1998 | Bock | 425/557 |

(Continued)

FOREIGN PATENT DOCUMENTS

| | | |
|---|---|---|
| CA | 2586617 | 5/2006 |
| EP | 0494304 | 9/1994 |

(Continued)

*Primary Examiner* — Tim Heitbrink
(74) *Attorney, Agent, or Firm* — Bereskin & Parr LLP/S.E.N.C.R.L., s.r.l.

(57) ABSTRACT

An injection unit for an injection molding machine includes a nozzle for dispensing melt to a mold, and a valve housing having a first port in fluid communication with the nozzle. The valve housing has a second port and a third port. A plasticizing barrel is in fluid communication with the second port. A shooting pot is in fluid communication the third port. A valve closure member is mounted in the valve housing. The valve closure member is moveable between a first position in which the first port is in fluid communication with the third port and in fluid isolation of the second port, and a second position in which the second port is in fluid communication with the third port and in fluid isolation of the first port. When in at least one of the first and second positions, fluid communication is provided between the respective ports through a gap provided between an outer surface of the closure member and an inner surface of the valve housing.

26 Claims, 27 Drawing Sheets

(56) References Cited

U.S. PATENT DOCUMENTS

| | | |
|---|---|---|
| 6,454,558 B1 | 9/2002 | Gellert |
| 7,377,769 B2 | 5/2008 | Chen et al. |
| 7,614,871 B2 | 11/2009 | Condo |
| 7,670,537 B2 * | 3/2010 | Ujma et al. ............... 264/328.1 |
| 7,754,134 B2 | 7/2010 | Wagner |

| | | |
|---|---|---|
| 2009/0065724 A1 | 3/2009 | Mitton et al. |

FOREIGN PATENT DOCUMENTS

| | | |
|---|---|---|
| JP | H09123218 | 5/1997 |
| WO | 2004050325 | 6/2004 |

* cited by examiner

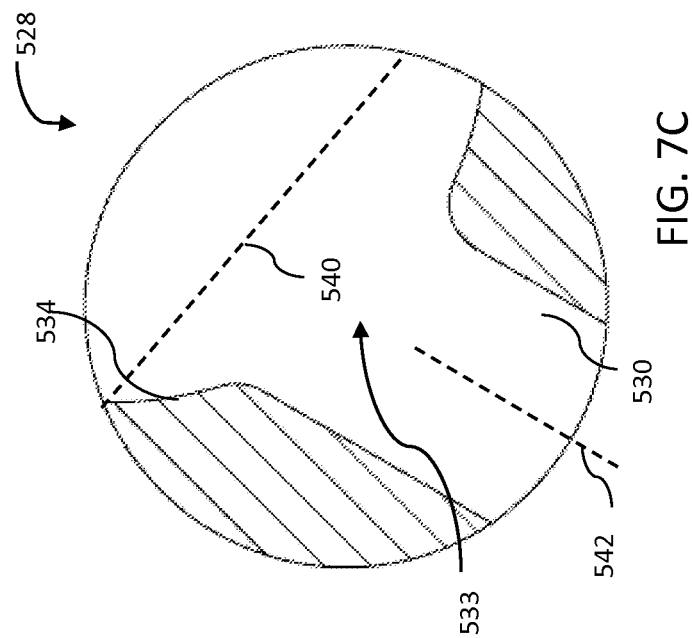
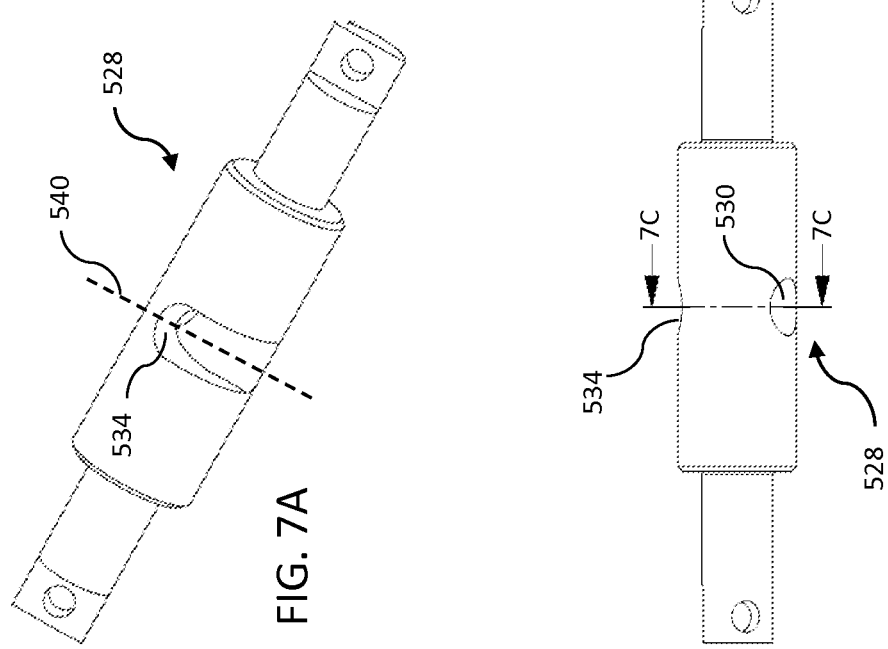
FIG. 7A  FIG. 7B  FIG. 7C

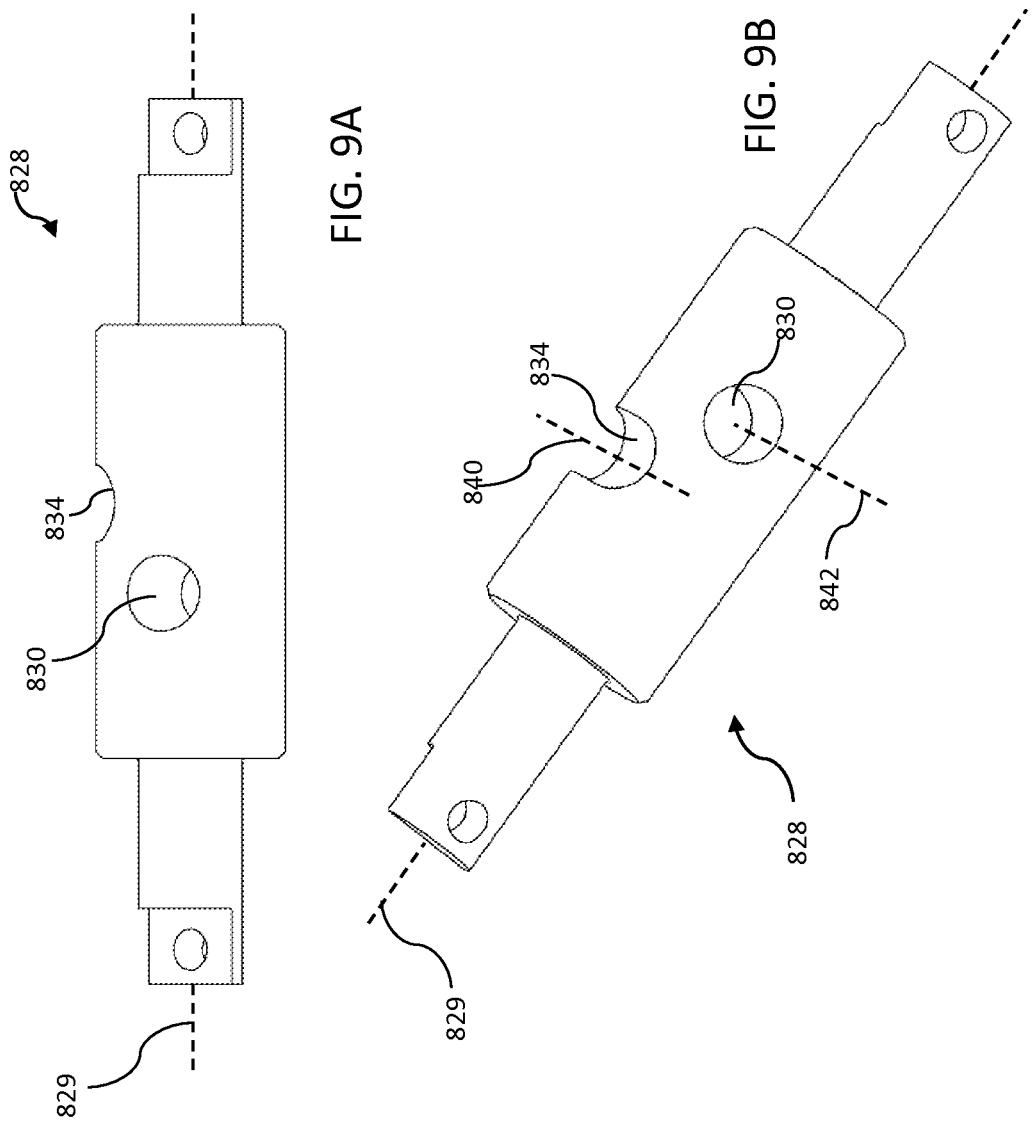

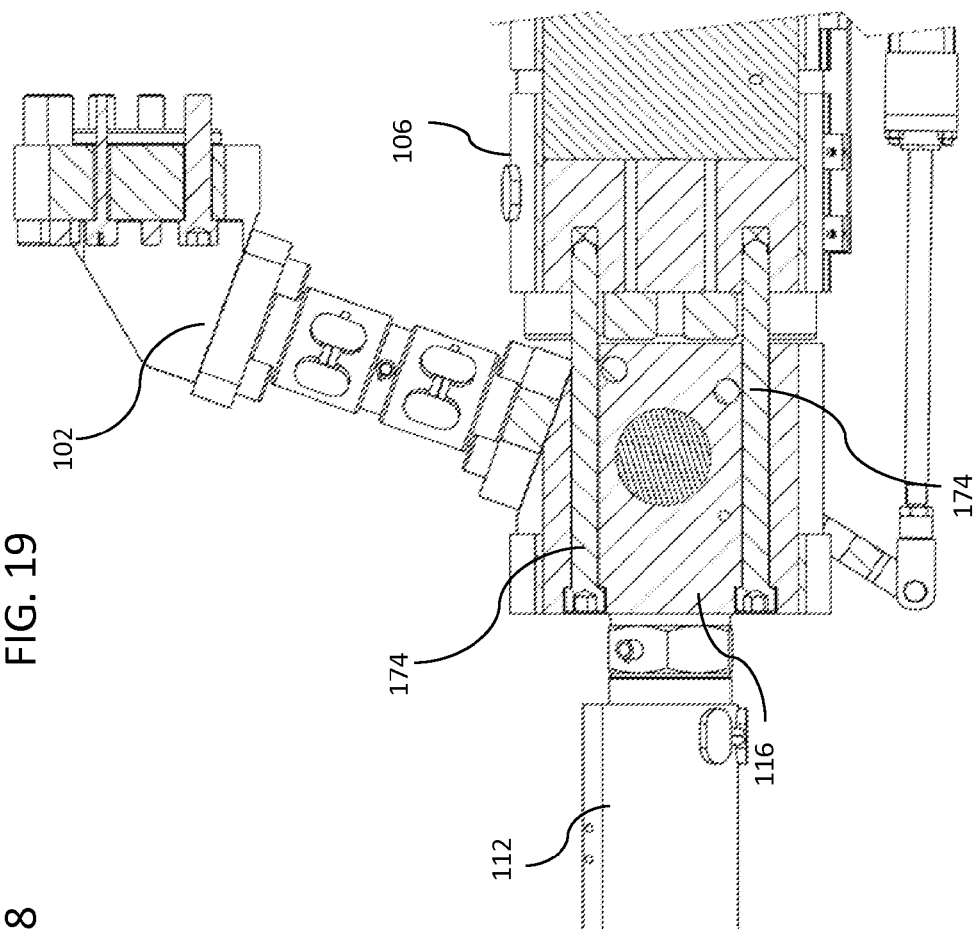
FIG. 19
FIG. 18
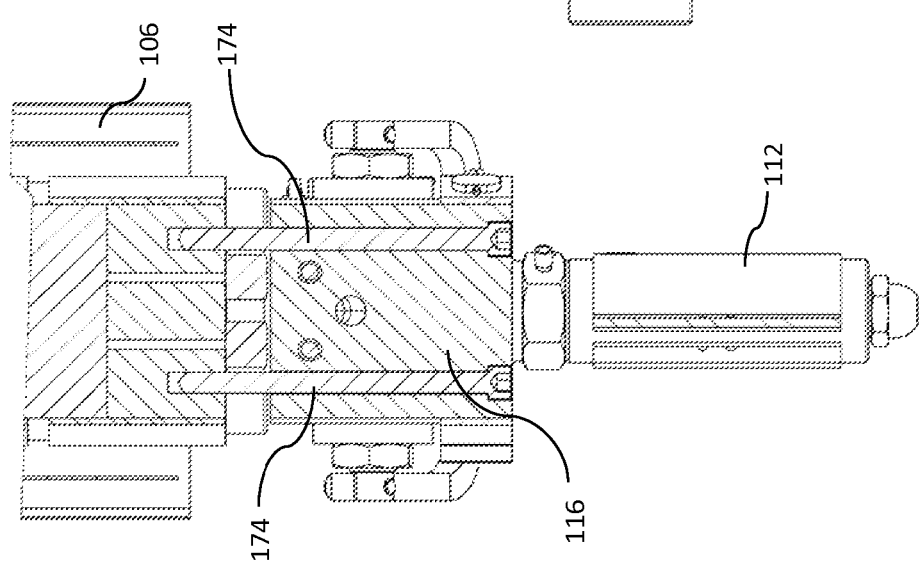

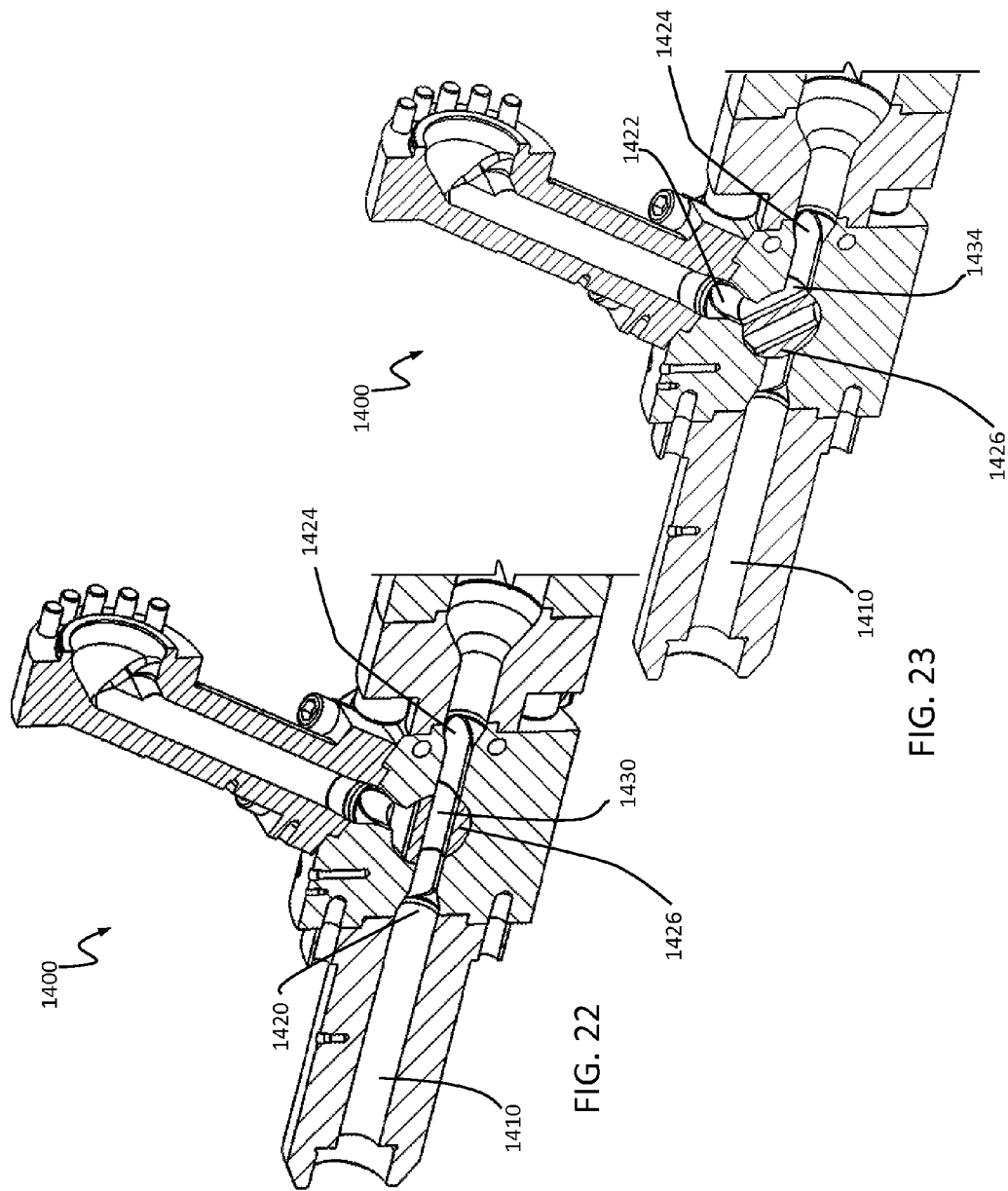

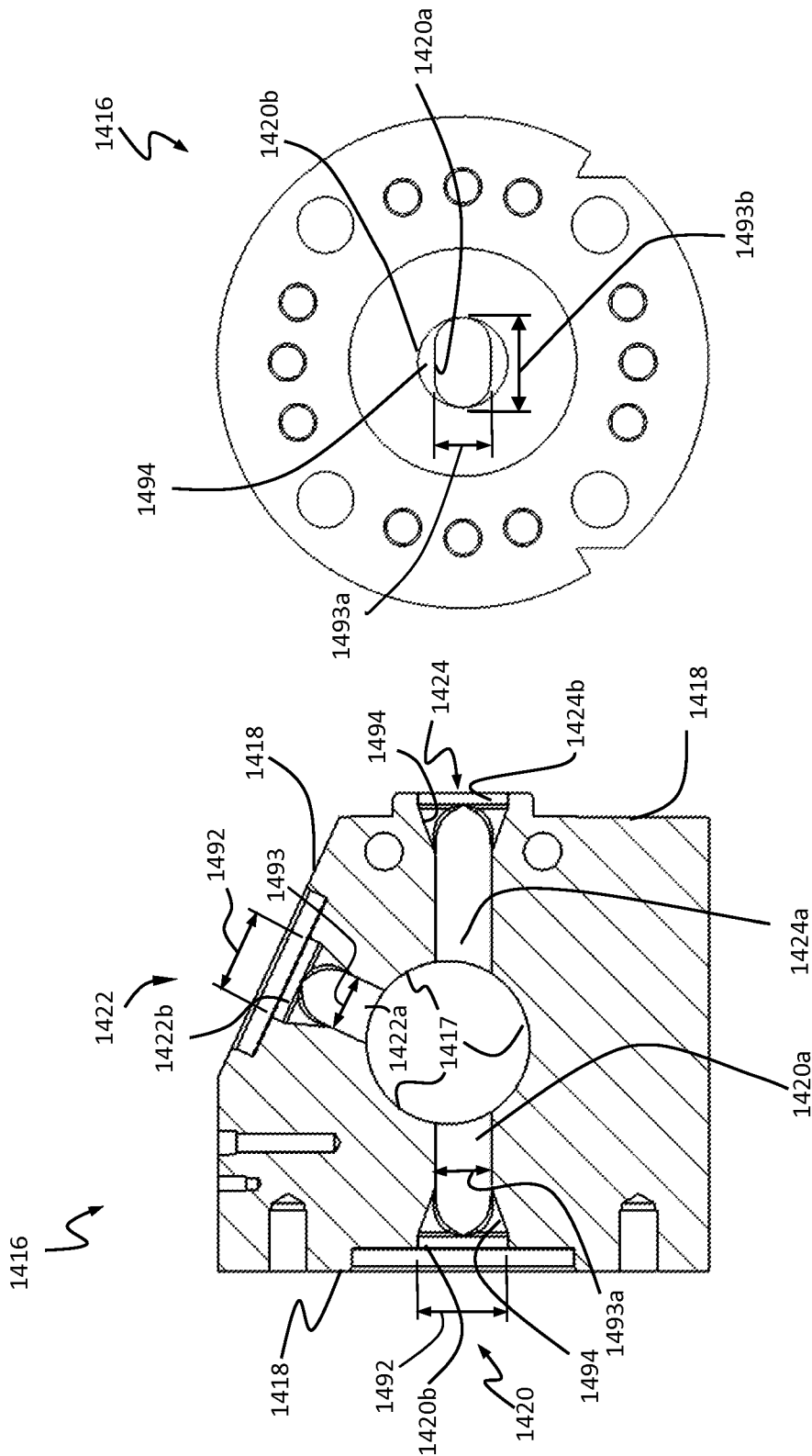

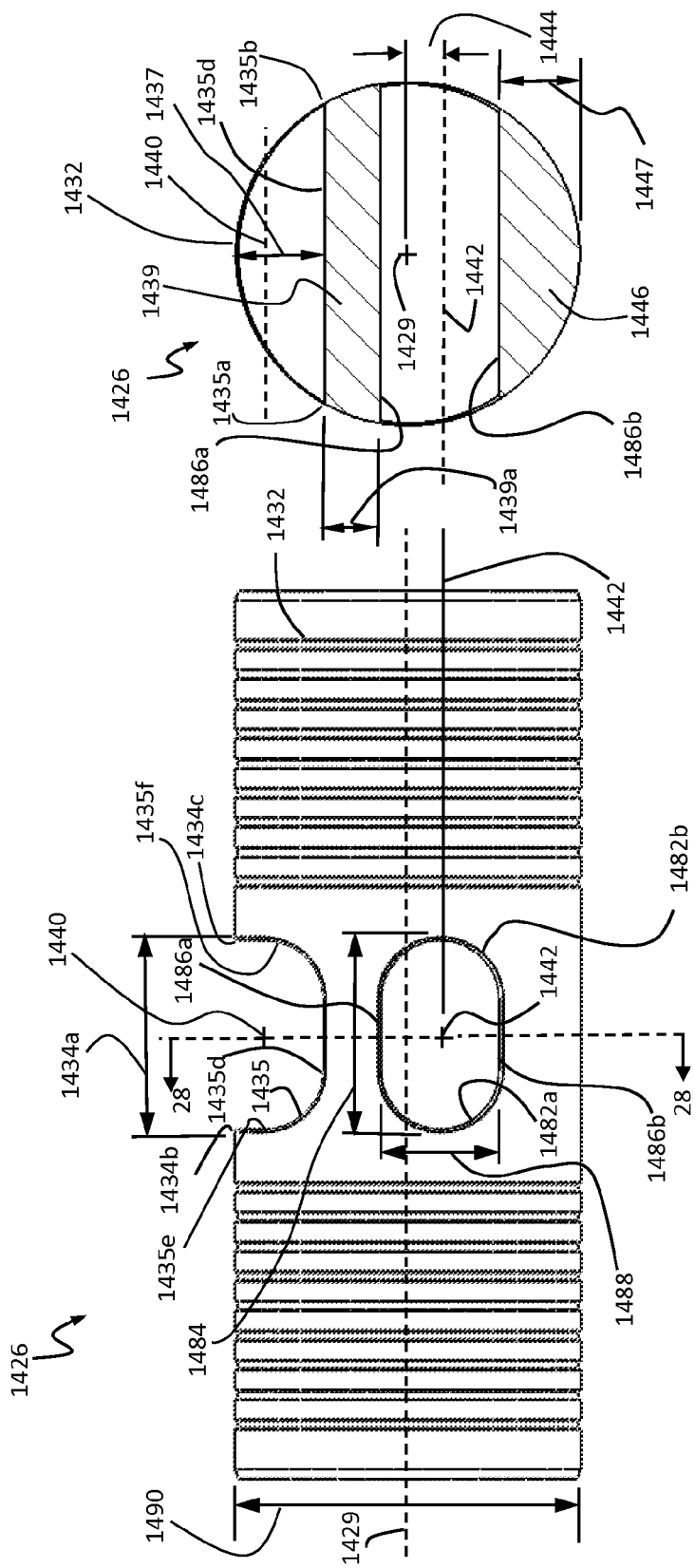

TWO STAGE INJECTION UNIT ROTARY VALVE

This application claims the benefit of Provisional Application Ser. No. 61/877,554, filed Sep. 13, 2013, which is hereby incorporated herein by reference.

FIELD

The disclosure relates to injection molding machines, injection units for injection molding machines, and valves for controlling melt flow from a plasticizing apparatus of an injection unit.

BACKGROUND

U.S. Pat. No. 3,233,865 (Panzica) purports to disclose a diversion valve for long life comprising a valve body having inlet and outlet ports and a cylindrical valve chamber, a cylindrical valve plug rotatably mounted in the valve chamber with clearances sufficient to maintain free passage of suspended particles and partially cut away leaving essentially two parallel disks with a segment of a cylinder extending between them. A stub axle is at one end of the plug on its axis of rotation and a longer control axle is at the opposite end. The valve further includes main bearings for the axles, and bearing seals for isolating the main bearings from the valve chamber.

U.S. Pat. No. 5,380,184 (von Holdt) purports to disclose an injection mold with multiple cavities. A mold gate is provided which comprises a rotary spherical member having a sprue conduit extending transversely therethrough. According to the reference, highly accurate sequential molding of multiple cavities can be achieved in this manner, as well as other advantages. Also, this arrangement permits a linear, straight sprue conduit which is free of any sharp turns.

U.S. Pat. No. 7,614,871 (Condo) purports to disclose a rotary valve assembly for an injection unit having a valve body defining a melt channel for a working fluid. At least one end cap is mounted to the valve body. The valve body and the at least one end cap cooperatively define a valve seat intersecting the melt channel in a generally traverse direction. The valve seat has a wider portion and a narrower portion. A spool defines an orifice. The spool is rotatably mounted within the valve seat, and is movable between an open position where the orifice is aligned with the melt channel and a closed position where the orifice is misaligned with the melt channel.

U.S. Pat. No. 7,754,134 (Wagner) purports to disclose an injection molding process that improves recovery limited productivity. According to the reference, pressurized fluid is applied within the nozzle of an injection molding machine to improve the machine's productivity. An existing or new injection molding machine is outfitted with a pressurized fluid system at the nozzle between the plasticizer barrel and the melt manifold. The use of a specialized nozzle and isolation valve allows the pressurized fluid to displace material within the nozzle and runner, ensuring the proper pressure is applied to the plastic resin within the mold during pack and hold while the plasticizing screw can begin its recovery cycle. Finally, the pressurized fluid can be evacuated from the nozzle melt stream area either via the fluid entrance or a fluid pin.

International Patent Application Publication No. WO2004050325 (Weinmann) purports to disclose a method and an installation for producing injection molded parts, especially preforms, the liquid melt being directly received by a chemical production installation and continuously supplied to an injection molding machine. If the melt is in a degassing state ready to inject, at least two injection cylinders comprising controlled or regulated injection pistons are alternately charged with the continuous melt flow, said pistons enabling the injection cycle to be carried out in a push-pull mode in relation to the charging of the cylinders.

SUMMARY

The following summary is intended to introduce the reader to various aspects of the applicant's teaching, but not to define any invention.

According to some aspects, an injection unit for an injection molding machine includes (i) a nozzle for dispensing melt to a mold; (ii) a valve housing having in inner surface defining a valve seat, a first port in fluid communication with the nozzle, and a second port and a third port each spaced apart from the first port; (iii) a plasticizing barrel in fluid communication with the second port; (iv) a shooting pot in fluid communication with the third port; and (v) a valve closure member mounted in the valve seat, the valve closure member including a cross-bore extending through the valve closure member and a surface notch enclosed at least in part by the inner surface of the housing, the surface notch in fluid isolation from the cross-bore. The valve closure member is moveable between a first position in which the first port is in fluid communication with the third port via the cross-bore and in which the second port is in fluid isolation of the first and third ports, and a second position in which the second port is in fluid communication with the third port via the surface notch and the first port is in fluid isolation of the second and third ports.

In some examples, the valve closure member may include a generally cylindrical outer surface disposed about a valve axis and the surface notch is disposed in the outer surface. The closure member may be rotatable about the valve axis to move the closure member between the first position and the second position. An outer periphery of the closuremember may provide a seal surface around an entire periphery of the surface notch.

In some examples, the cross-bore may have opposed ends opening to the cylindrical outer surface of the valve closure member. The cross-bore may extend linearly along a cross-bore centerline, the cross-bore centerline offset from the valve axis in a direction orthogonal to the valve axis by a cross-bore offset.

In some examples, the outer surface of the closure member may define a spool diameter, and the ratio of the cross-bore offset to the spool diameter may be in the range from about 0.05 to about 0.15, or in the range from about 0.07 to about 0.10.

In some examples, the surface notch may have a notch centerline, and the cross-bore centerline and notch centerline may be aligned in a common plane perpendicular to the valve axis. The second port and the third port may be open to the inner surface of the valve housing, and be spaced circumferentially apart about the inner surface by a circumferential port spacing. The notch may have a circumferential extent measured about the valve axis that is generally equal to or greater than the circumferential port spacing.

In some examples, the ports may be in axial alignment, and the surface notch may extend linearly along a notch centerline that is oriented generally perpendicular to the valve axis. The cross-bore may have a cross-bore centerline and the notch may have a notch centerline, and the cross-bore centerline and the notch centerline may be aligned in respective first and second planes perpendicular to the valve axis, the first and second planes spaced apart from each other along the valve axis.

In some examples, the cross-bore may extend linearly along a cross-bore centerline and have a rounded rectangular cross-bore profile in cross-section, the cross-bore profile generally enclosing the cross-bore about the cross-bore centerline. The cross-bore profile may have a major width extending between opposed cross-bore lateral surfaces spaced apart from each other along the valve axis and on opposite sides of the cross-bore centerline, and a minor width extending between opposed cross-bore axial surfaces extending in a direction generally parallel to the valve axis and spaced apart from each other on opposite sides of the cross-bore centerline.

In some examples, the ratio of the minor width to the major width may be in the range from about 0.3 to about 0.9, and may be in the range from about 0.55 to about 0.65.

The surface notch may have a U-shaped profile having a notch width extending along the valve axis between spaced apart notch sides, and a notch depth extending inwardly of the outer surface to a notch bottom surface. The notch width may be generally equal to, and axially aligned with, the cross-bore major width. The notch depth may generally be between about 50 percent and 95 percent of the cross-bore minor width.

According to one aspect, an injection unit for an injection molding machine comprises a nozzle for dispensing melt to a mold, and a valve housing having a first port in fluid communication with the nozzle. The valve assembly has a second port and a third port. A plasticizing barrel is in fluid communication with the second port. A shooting pot is in fluid communication the third port. A valve closure member is mounted in the valve housing. The valve closure member is moveable between a first position in which the first port is in fluid communication with the third port and in fluid isolation of the second port, and a second position in which the second port is in fluid communication with the third port and in fluid isolation of the first port. When in at least one of the first and second positions, fluid communication is provided between the respective ports through a gap provided between an outer surface of the closure member and an inner surface of the valve housing.

In some examples, the closure member may have a generally cylindrical outer surface defining a valve axis, and the closure member may be rotatable about the valve axis between the first position and the second position.

In some examples, the inner surface may be generally cylindrical.

In some examples, the outer surface of the closure member may comprise a notch providing the gap between the outer surface and the inner surface.

In some examples, the second port and the third port may be open to the inner surface of the valve housing, and spaced circumferentially apart about the inner surface by a circumferential port spacing. The notch may have a circumferential extent generally equal to or greater than the circumferential port spacing. The ports may be in axial alignment, and the notch may be aligned generally perpendicular to the valve axis.

In some examples, the valve closure member may have a cross-bore with respective ends in communication with the first port and the third port when in the first position. The cross-bore may be generally perpendicular to valve axis. The cross-bore may have a cross-bore centerline that is spaced from the valve axis. The notch may have a notch centerline, and the cross-bore centerline and notch centerline may be in axial alignment. Alternatively, the cross bore centerline and the notch centerline may be axially offset.

According to another aspect, an injection unit for an injection molding machine comprises a plasticizing apparatus comprising a plasticizing barrel, a plunger apparatus comprising a shooting pot, and an injection nozzle comprising an nozzle conduit. The injection unit further comprises a valve assembly comprising a valve housing, and a rotary spool within the valve housing. The rotary spool is movable between a first position and a second position. The rotary spool comprises a cross-bore extending at least partially therethrough, and a cylindrical outer surface having a notch formed therein. At least one of the cross-bore and the notch provide fluid communication between the shooting pot and the nozzle conduit when the rotary spool is in the first position. The notch provides fluid communication between the plasticizing barrel and the shooting pot when the rotary spool is in the second position.

In some examples, the cross-bore may extend through the spool, and the cross-bore alone may provide fluid communication between the shooting pot and the nozzle conduit. The bore and the notch may be in fluid isolation from each other.

In some examples, the cross-bore and the notch may be in fluid communication with each other. The cross-bore and notch may together provide fluid communication between shooting pot and the nozzle conduit.

In some examples, the rotary spool may extend along a valve axis, the bore may extend along a bore centerline, and the bore centerline may be perpendicular to and spaced from the valve axis.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 7A is a perspective view of the closure member of FIGS. 5 and 6;

FIG. 7B is a front elevation view of the closure member of FIG. 7A;

FIG. 7C is a cross-sectional view taken along line 7C-7C in FIG. 7B;

FIG. 9A is a front elevation view of the closure member of FIGS. 8A to 8D;

FIG. 9B is a perspective view of the closure member of FIGS. 8A to 8D;

FIG. 18 is a cross-sectional view taken along line 18-18 in FIG. 17;

FIG. 19 is a cross-sectional view taken along line 19-19 in FIG. 17;

FIGS. 22 and 23 are perspective views of the structure of FIGS. 20 and 21, respectively;

FIG. 24 is an enlarged portion of a housing of FIG. 20;

FIG. 25 is a front view of the housing of FIG. 24;

FIG. 27 is a front elevation view of the closure member of FIG. 26; and

FIG. 28 is a cross-sectional view taken along line 28-28 in FIG. 27.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any exclusive right granted by issuance of this patent application. Any invention disclosed in an apparatus or process described below and for which an exclusive right is not granted by issuance of this patent application may be the subject matter of another protective instrument, for example, a continuing patent application, and the applicants, inventors or owners do not intend to abandon, disclaim or dedicate to the public any such invention by its disclosure in this document.

Figure 1A:
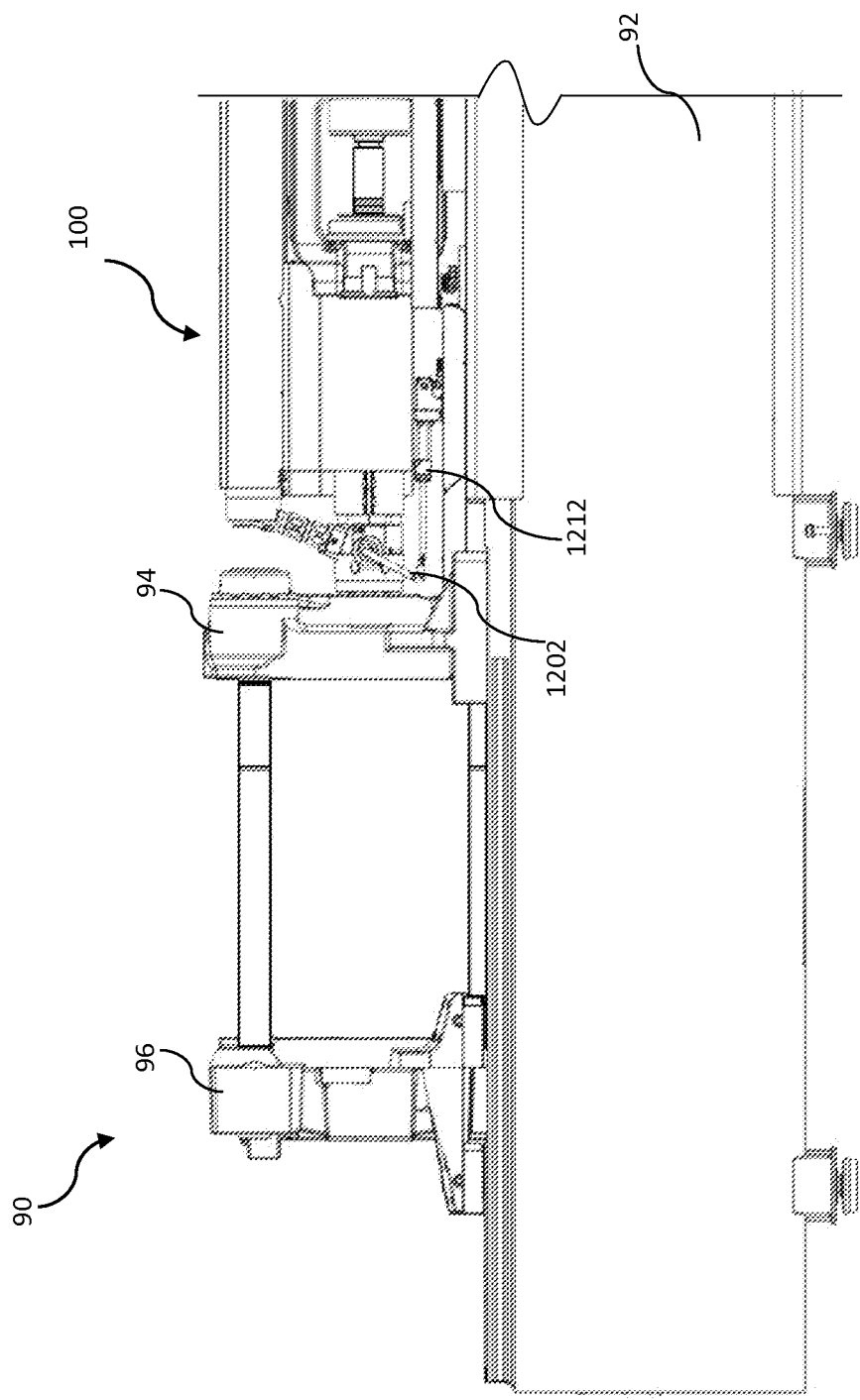
FIG. 1A is a partial side view of an example injection molding machine.
Figure 1B:
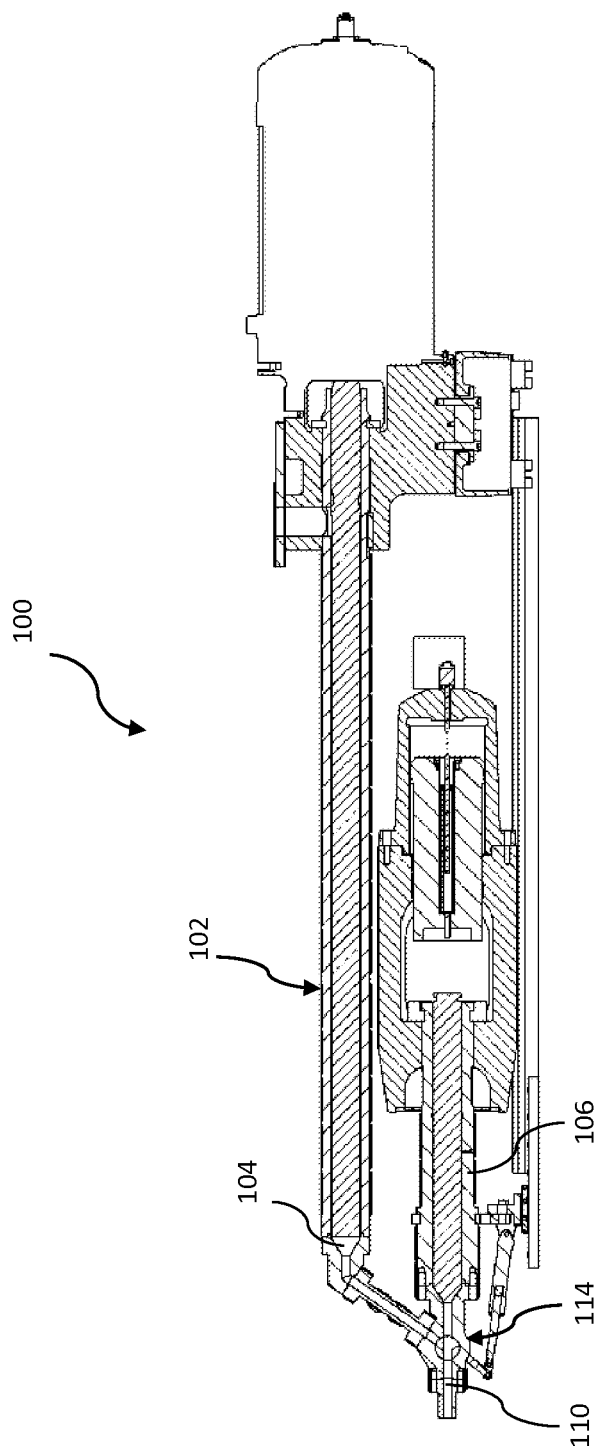
FIG. 1B is a cross-sectional view of the injection unit of FIG. 1.
Figure 2:
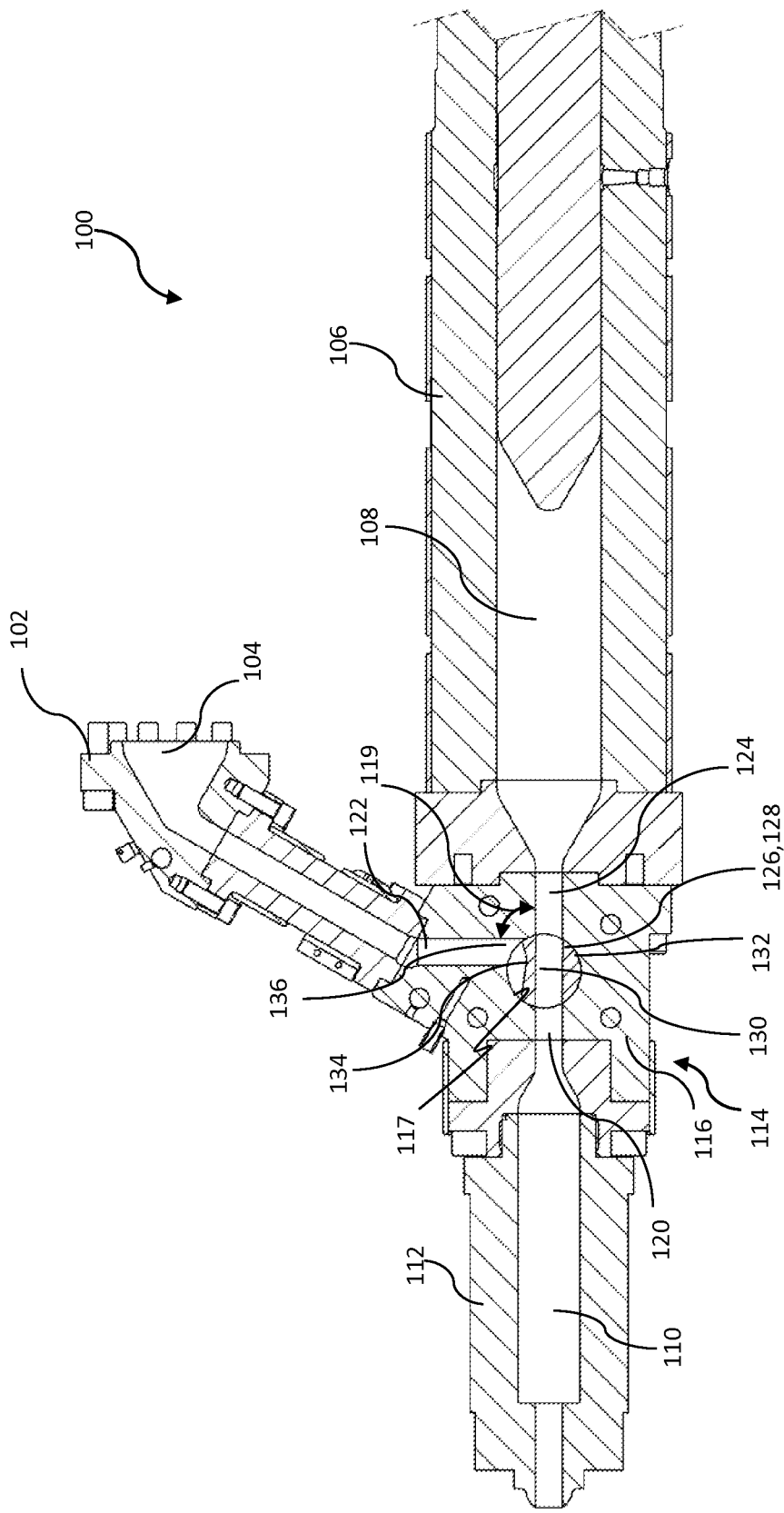
FIG. 2 is an enlarged view of the valve assembly of FIG. 1B, showing a closure member of a valve assembly in a first position.

Referring to FIGS. 1A and 1B, an exemplary injection unit 100 for an injection molding machine 90 is shown. In the example illustrated, the machine 90 includes a base 92, and a stationary platen 94 and a moving platen 96 supported by the base 92. Referring also to FIG. 2, the injection unit 100 includes a plasticizing apparatus 102, which includes a plasticizing barrel 104. The plasticizing apparatus 102 may plasticize resin (also referred to as "melt") housed in the plasticizing barrel 104. The injection unit further includes a plunger apparatus 106, which includes a shooting pot 108. The shooting pot 108 may receive melt from the plasticizing barrel 104. The plunger apparatus 106 may force the melt from the shooting pot 108, and through a nozzle conduit 110 of a nozzle 112, to dispense the melt into a mold (not shown).

Referring to FIG. 2, a valve assembly 114 is provided between the plasticizing apparatus 102, plunger apparatus 106, and nozzle 112, for alternately providing fluid communication between the plasticizing apparatus 102 and the plunger apparatus 106, or between the plunger apparatus 106 and the nozzle 112.

Referring still to FIG. 2, in the example shown, the valve assembly 114 includes a valve housing 116, which includes a generally cylindrical inner surface 117 defining a valve seat. The valve housing 116 further includes a first port 120 open to the inner surface 117 and in fluid communication with the valve seat and the nozzle conduit 110 of the nozzle 112, a second port 122 open to the inner surface 117 and in fluid communication with the valve seat and the plasticizing barrel 104 of the plasticizing apparatus 102, and a third port 124 open to the inner surface 117 and in fluid communication with the valve seat and the shooting pot 108 of the plunger apparatus 106.

Figure 3:
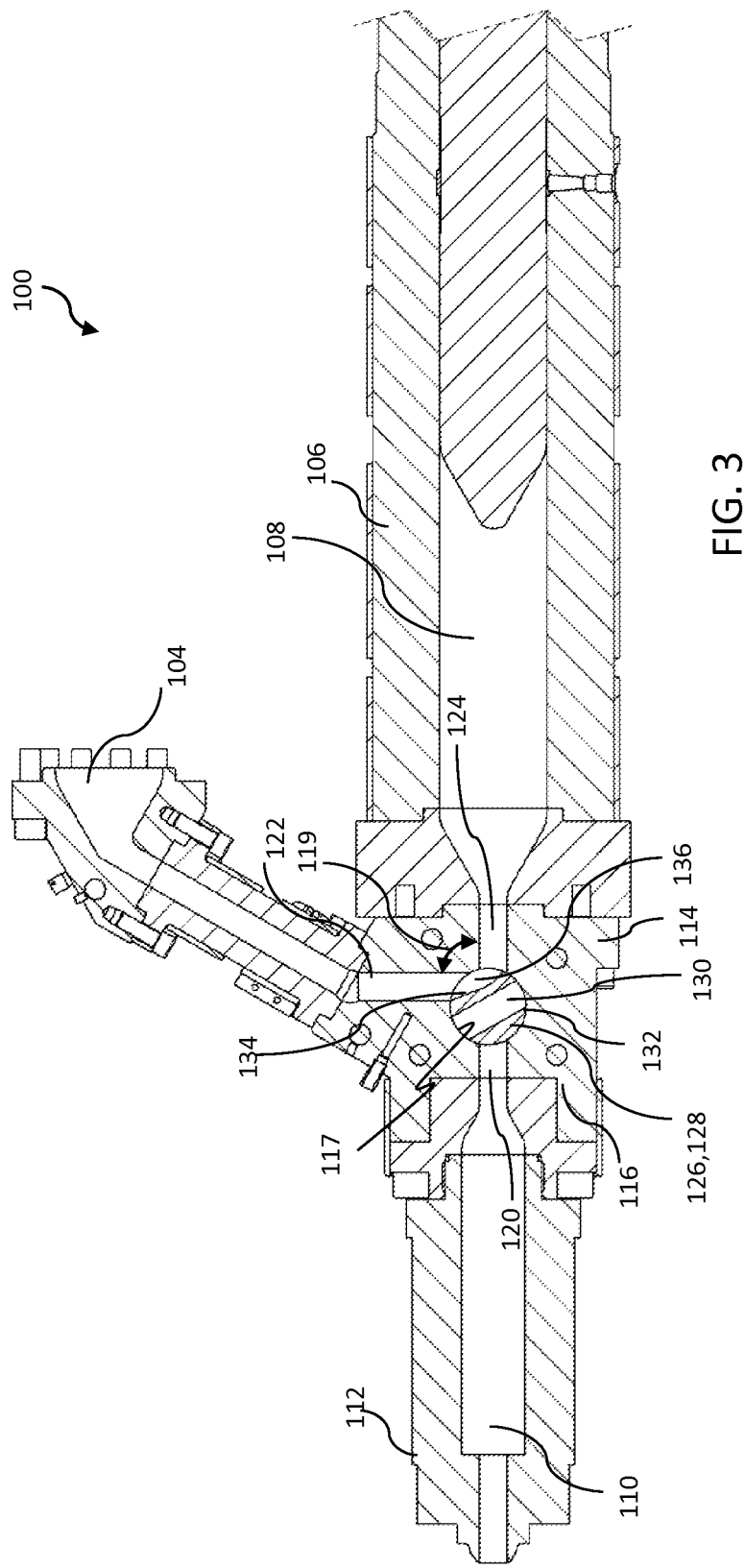
FIG. 3 is an enlarged view of the valve assembly of FIG. 1B, showing the closure member of the valve assembly in a second position.

Referring now to FIGS. 2 and 3, a valve closure member 126 is mounted in the valve seat. The valve closure member 126 is moveable between a first position, shown in FIG. 2, and a second position, shown in FIG. 3. When the closure member 126 is in the first position, the first port 120 is in fluid communication with the third port 124 and in fluid isolation of the second port 122, and the nozzle conduit 110 is in fluid communication with the shooting pot 108. When the closure member 126 is in the second position, the second port 122 is in fluid communication with the third port 124 and in fluid isolation of the first port 120, and the plasticizing barrel 104 is in fluid communication with the shooting pot 108.

Figure 4:
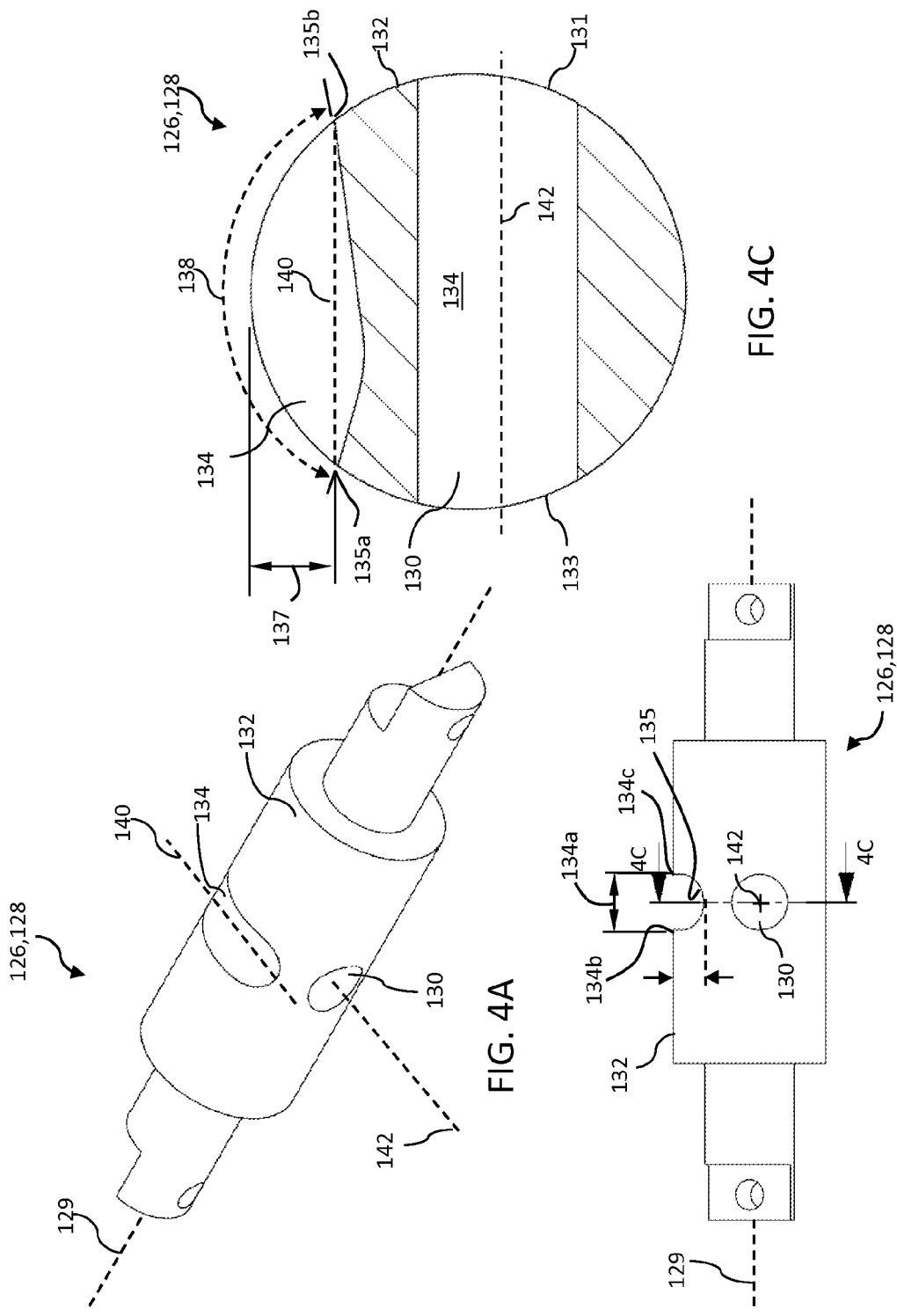
FIG. 4A is a perspective view of the closure member of FIGS. 2 and 3.
FIG. 4B is a front elevation view of the closure member of FIG. 4A.
FIG. 4C is a cross-sectional view taken along line 4C-4C in FIG. 4B.

In the example shown, the valve closure member 126 comprises a rotary spool 128 having a generally cylindrical outer surface 132, which defines a longitudinal valve axis 129 (shown in FIGS. 4A and 4B). The rotary spool 128 is moveable between the first and second positions by rotation of the rotary spool 128 within the valve seat about the valve axis 129. The rotary spool 128 may be rotated by a valve actuation assembly 1200, described in further detail below.

The rotary spool may include a transverse bore extending at least partially therethrough, and a cylindrical outer surface having a cut-out or notch formed therein. At least one of the bore and the notch may provide fluid communication between the shooting pot and the nozzle conduit when the rotary spool is in the first position, and the notch may provide fluid communication between the plasticizing barrel and the shooting pot when the rotary spool is in the second position. Referring now to FIGS. 4A to 4C, in the example shown, the rotary spool 128 includes a transverse bore 130 (also called cross-bore) 130 that extends entirely therethrough, in a direction generally perpendicular to the valve axis 129, and spaced from the valve axis 129. The cross-bore 130 can have a circular cross-sectional profile, or can be oval or have a rounded rectangular profile, in which the extent of the bore in the axial direction (i.e. parallel to axis 129) is greater than in the direction normal to the axis 129.

In the example illustrated, the cylindrical outer surface 132 of the closure member 126 has a notch 134 formed therein. The notch 134 can be in the form of a cut-out or depression, having a notch width 134a that extends between first and second notch side edges 134b, 134c disposed on the outer cylindrical surface. The first and second notch side edges 134b, 134c can be spaced apart axially (in a direction parallel to the valve axis 129). A recessed surface 135 can extend generally downwardly from the notch side edges, towards the valve axis 129. The side edges 134b, 134c can extend laterally in a direction generally orthogonal to the valve axis 129. In the example illustrated, the recessed surface 135 has a generally semi-cylindrical profile when viewed in cross-section. The notch 134 can have a notch length (notch circumferential extent) 138 that extends in a lengthwise (or circumferential) direction between first and second notch end edges 135a, 135b. The notch circumferential extent 138 can be at least about 75 degrees, and in the example illustrated, is between about 80 and about 100 degrees. The notch 134 has a nominal notch depth 137 generally defined by the maximum radial distance between a chord intersecting the first and second notch end edges 135a, 135b and the projected outer surface 132.

The notch 134 has an open outer face disposed opposite the recessed surface 135 and which is generally closed off at least in part by the inner surface of the valve housing. The recessed surface 135 and the opposed inner surface of the valve housing cooperate to laterally enclose a surface channel or conduit through which the melt can flow. The surface channel has a channel cross-sectional area that is sufficiently large to transfer melt through the surface channel at a desired flow rate. Each of the second port and third port has a respective second port and third port cross-sectional area, and the channel cross-sectional area can be at least half the size of the smallest one of the second and third cross-sectional areas. In some examples, the second and third cross-sectional areas can be generally equal, and the channel cross-sectional area can be at least 75 percent the size of the second and third cross-sectional areas.

The second port 122 and third port 124 are spaced circumferentially apart about the inner surface 117 by a circumferential port spacing 119 (shown in FIGS. 2 and 3), and the notch circumferential extent 138 (shown in FIG. 4C) is generally equal to or greater than the circumferential port spacing 119. The notch 134 provides a gap 136 between the outer surface 132 of the rotary spool 128, and the inner surface 117 of the valve housing 116 (shown in FIGS. 2 and 3).

Referring to FIGS. 2 and 3, in the example shown, the cross-bore 130 and the gap 136 are spaced apart and are in fluid isolation from each other. In the example illustrated, the spool body material provides a barrier between the outer surface of the cross-bore 130 and the recessed surface of the notch 134. When the rotary spool 128 is in the first position, shown in FIG. 2, respective ends 131, 133 (shown in FIG. 4C) of the bore are in communication with the first port 120 and the third port 124, and the cross-bore 130 alone provides fluid communication between the shooting pot 108 and the nozzle conduit 110. As used herein, the phrase "the cross-bore alone . . . " indicates that the gap 136 does not form part of the fluid path between the shooting pot 108 and the nozzle conduit 110. When the rotary spool 128 is in the second position, shown in FIG. 3, the gap 136 provides fluid communication between the plasticizing barrel 104 and the shooting pot 108.

Referring still to FIGS. 2 and 3, in the example shown, the first port 120, second port 122, and third port 124 are in axial alignment. That is, the first port 120, second port 122, and third port 124 meet the rotary spool 128 at the same axial position along the valve axis 129. Furthermore, as can be seen in FIG. 4A, the notch 134 is aligned generally perpendicular to the valve axis 129, along a notch centerline 140, and the bore 130 has a bore centerline 142 that is in axial alignment with the notch centerline 140. In alternate examples described below, the first port, second port, and third port may be axially mis-aligned with each other, and the bore centerline and notch centerline may be axially offset.

Referring now to FIGS. 5 to 7C, an alternate exemplary injection unit 500 is shown, in which similar features to the injection unit 100 are identified by like reference characters incremented by 400. The injection unit 500 includes an alternate rotary spool 528. Referring to FIGS. 7A to 7C, in the rotary spool 528, the bore 530 extends only partially through the rotary spool 528, and the second end 533 of the bore 530 is open to the notch 534 and in fluid communication with the gap 536 (shown in FIGS. 5 and 6), so that the bore 530 and the gap 536 are in fluid communication with each other. In this example, the bore centerline 542 and the notch centerline 540 are generally perpendicular to each other.

Figure 5:
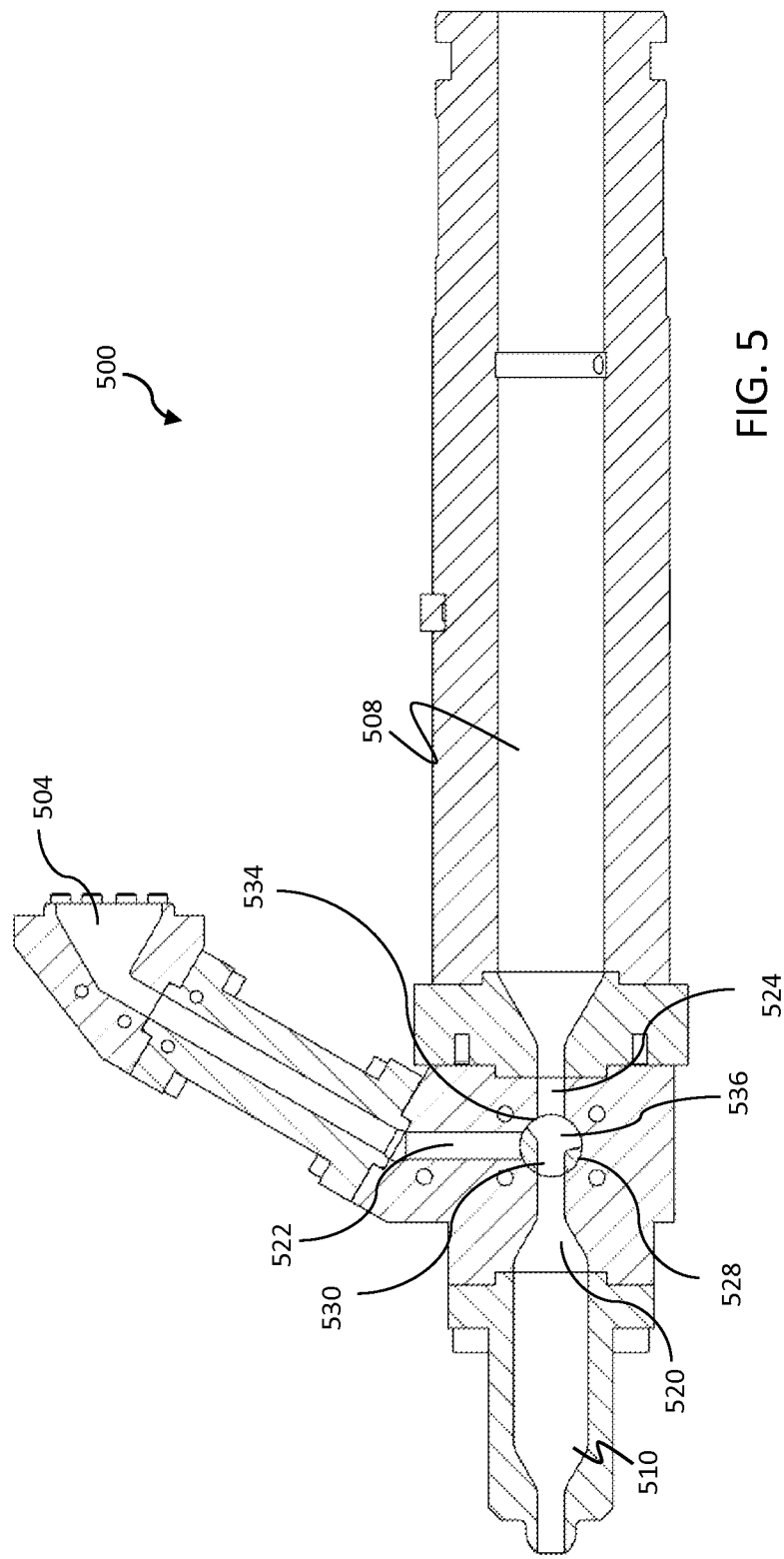
FIG. 5 is a partial cross-sectional view of an alternate valve assembly, showing the alternate closure member of the alternate valve assembly in a first position.
Figure 6:
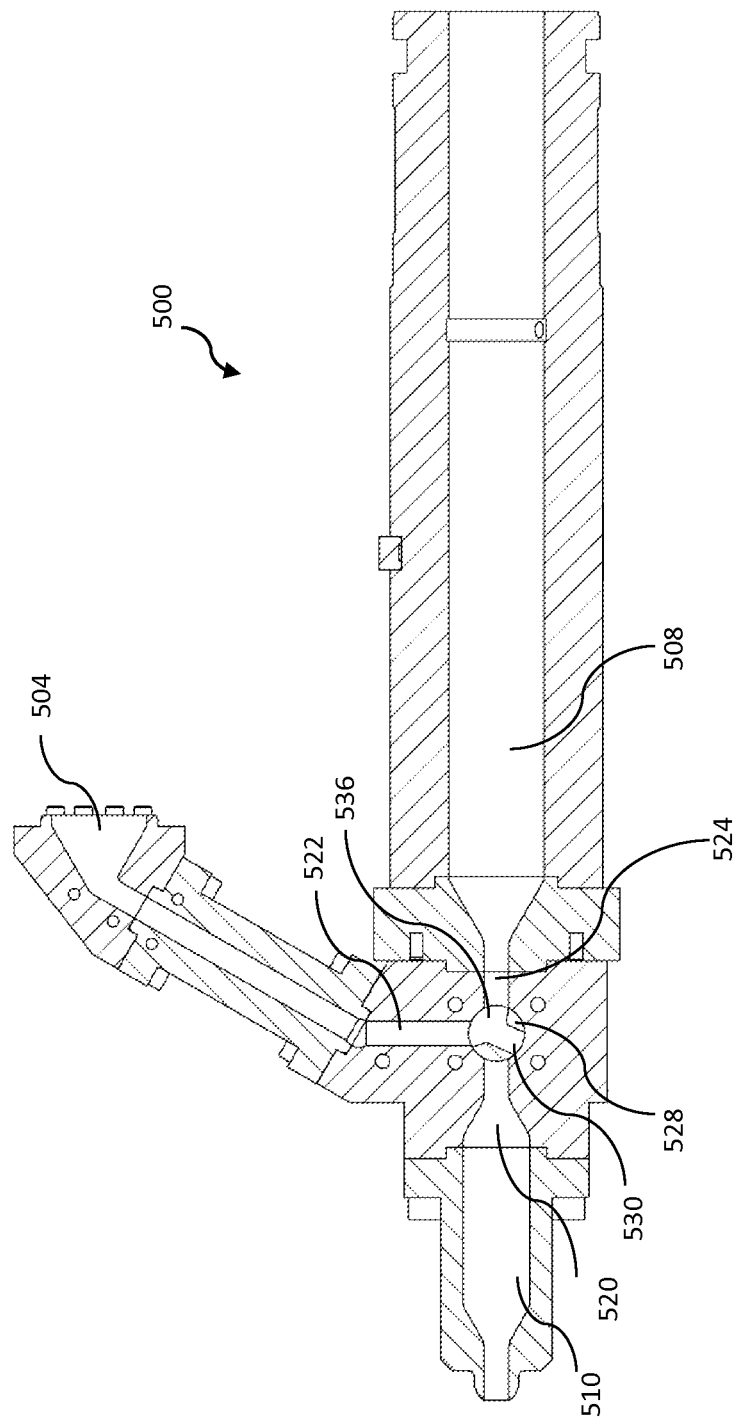
FIG. 6 is a partial cross-sectional view of the alternate valve assembly of FIG. 5, showing the alternate closure member of the alternate valve assembly in a second position.

Referring to FIG. 5, when the rotary spool 528 is in the first position, the bore 530 and the gap 536 together provide fluid communication between the nozzle conduit 510 and the shooting pot 508, via the first port 520 and the third port 524. When the rotary spool 528 is in the second position, shown in FIG. 6, the gap 536 provides fluid communication between the plasticizing barrel 504 and the shooting pot 508, via the second port 522 and the third port 524.

Referring now to FIGS. 8A to 9B, an alternate exemplary valve assembly 814 is shown, in which similar features to the valve assembly 114 are identified by like reference characters incremented by 700. The valve assembly 814 includes an alternate rotary spool 828, and an alternate third port 824. Referring to FIGS. 9A and 9B, in the rotary spool 828, the notch centerline 840 is axially offset from the bore centerline 842. That is, the notch centerline 840 and bore centerline 842 are at different positions along the valve axis 829. Further, referring to FIGS. 8A to 8D, the third port 824 includes a first portion 844 that is collinear with the first port 820, and open to the shooting pot and to the valve seat at an axial position aligned with the bore 830. The third port 824 further includes a second portion 846 extending generally perpendicular to the first portion 844, and open to the first portion 844 and to the valve seat an axial position aligned with the notch 834.

Figure 8A:
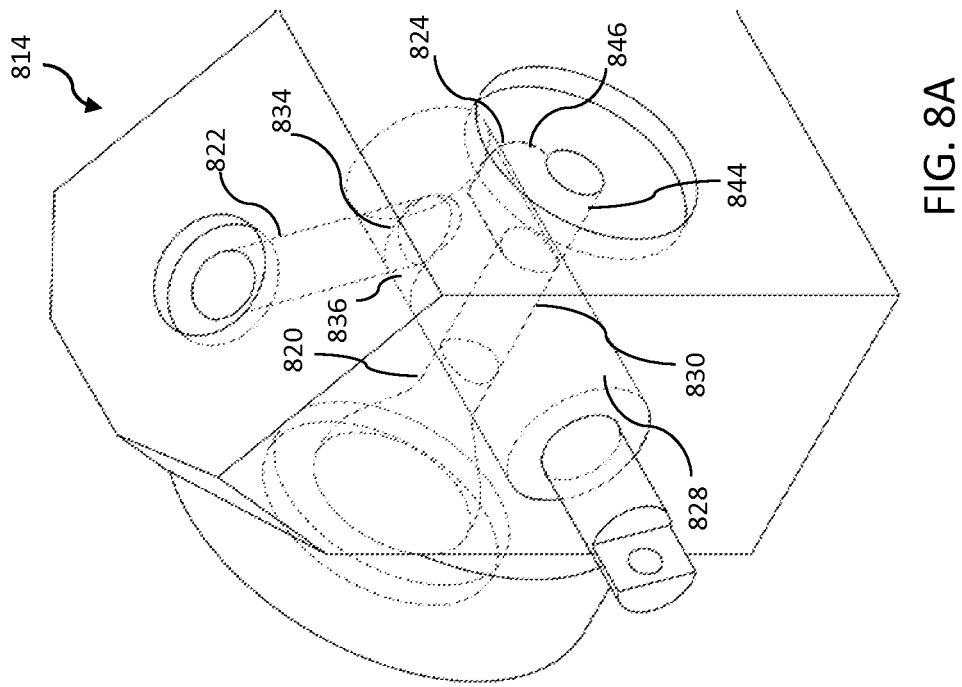
FIG. 8A is a perspective view of an alternate valve assembly, with the internal features shown in dotted line, showing the alternate closure member of the alternate valve assembly in a first position.
Figure 8C:
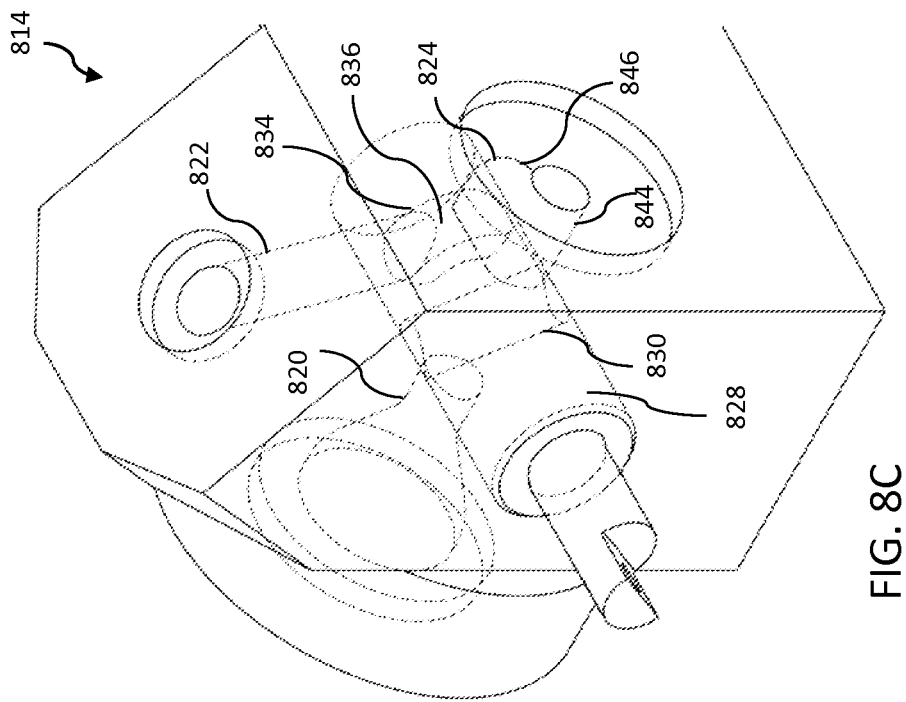
FIG. 8C is a perspective view of the valve assembly of FIG. 8A, with the internal features shown in dotted line, showing the alternate closure member of the alternate valve assembly in a second position
Figure 8B:
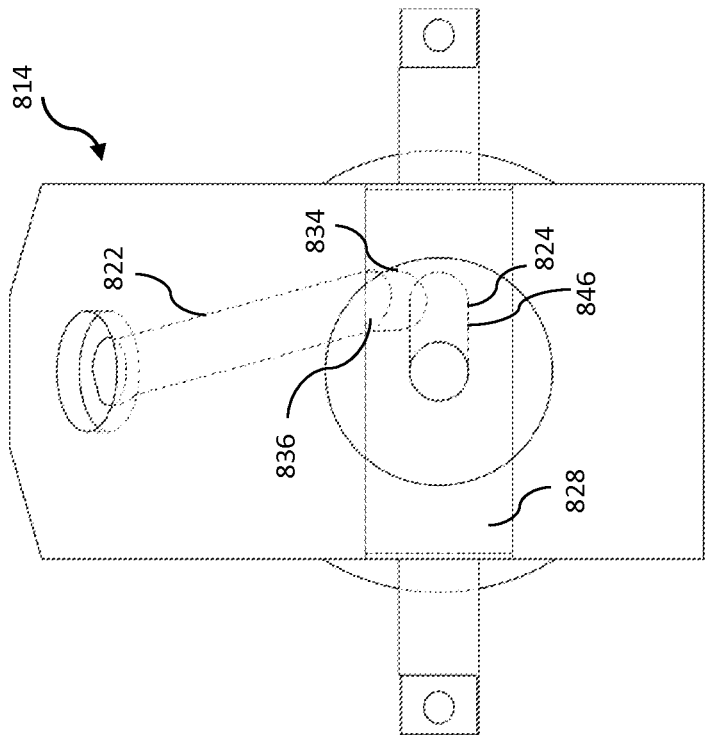
FIG. 8B is a front view of the valve assembly of FIG. 8A, with the internal features shown in dotted line.
Figure 8D:
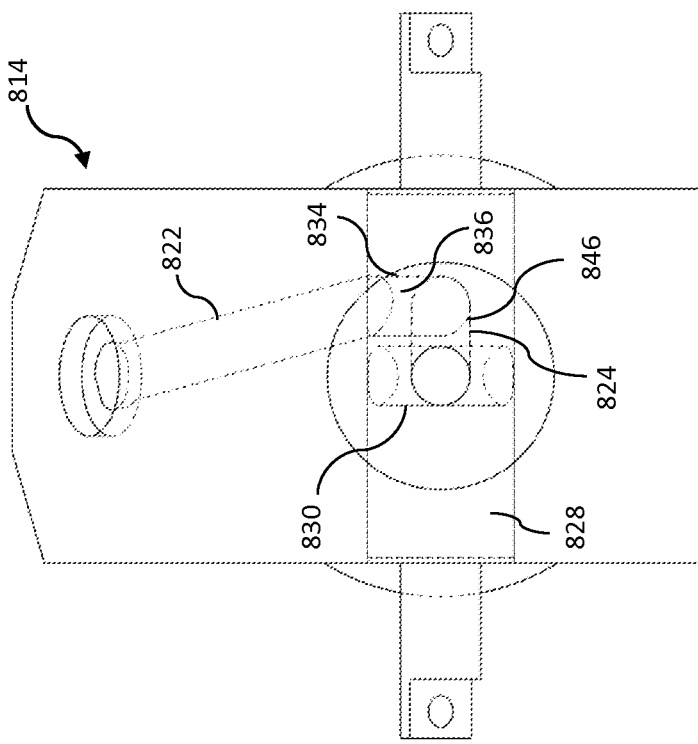
FIG. 8D is a front view of the valve assembly of FIG. 8C, with the internal features shown in dotted line.

Referring to FIGS. 8A and 8B, when the rotary spool 828 is in the first position, the bore 830 alone provides fluid communication between the shooting pot and the nozzle conduit, via the first port 820 and the first portion 844 of the third port 824. Referring to FIGS. 8C and 8D, when the rotary spool 828 is in the second position, the gap 136 provides fluid communication between the plasticizing barrel and the shooting pot, via the second port 822 and the both the first portion 844 and the second portion 846 of the third port 824.

Figure 10A:
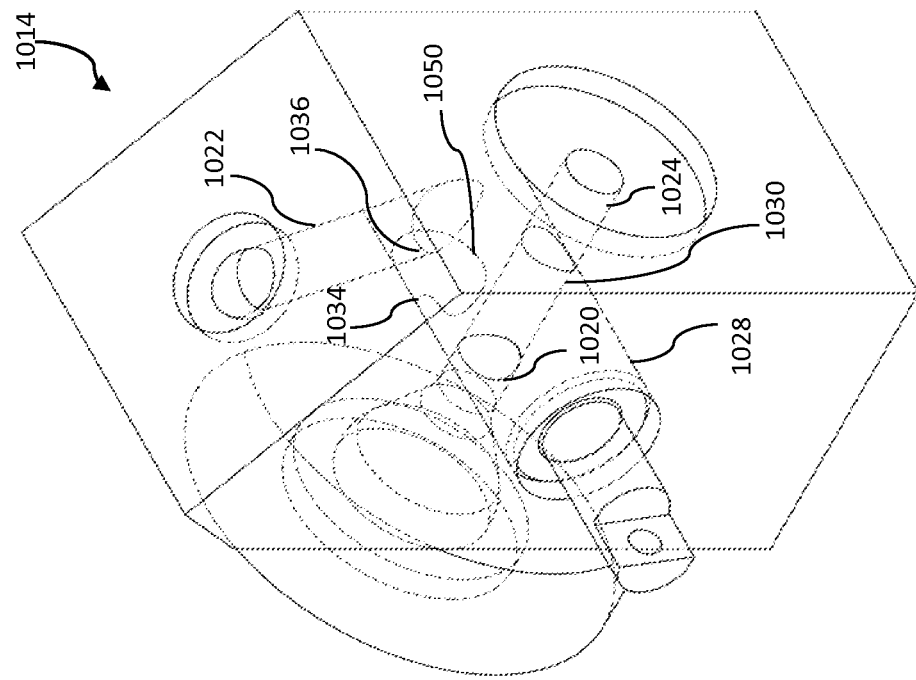
FIG. 10A is a perspective view of an alternate valve assembly, with the internal features shown in dotted line, showing the alternate closure member of the alternate valve assembly in a first position.
Figure 10C:
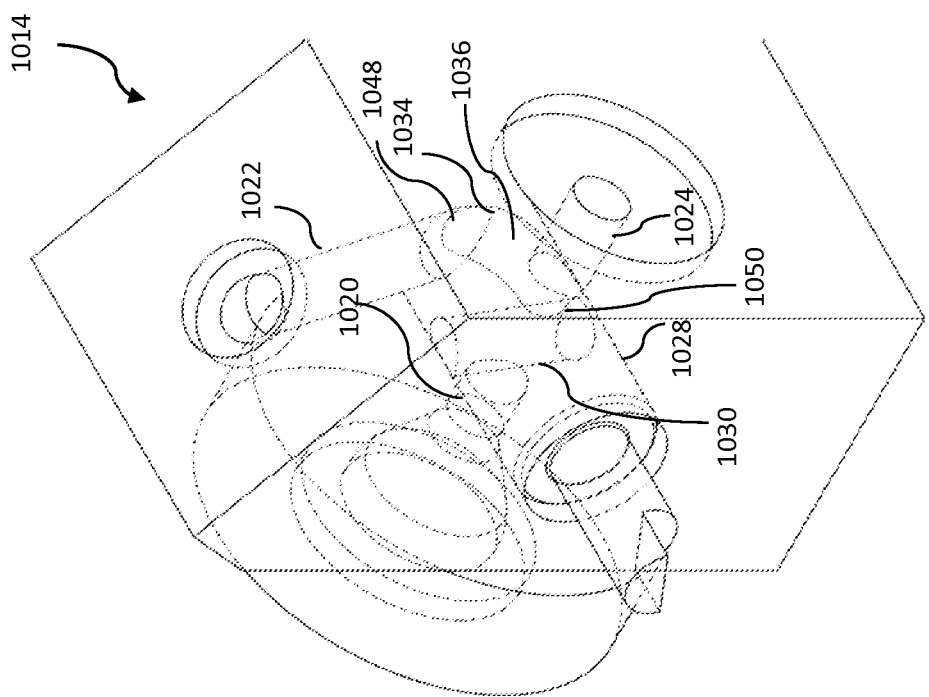
FIG. 10C is a perspective view of the valve assembly of FIG. 10A, with the internal features shown in dotted line, showing the alternate closure member of the alternate valve assembly in a second position.
Figure 10B:
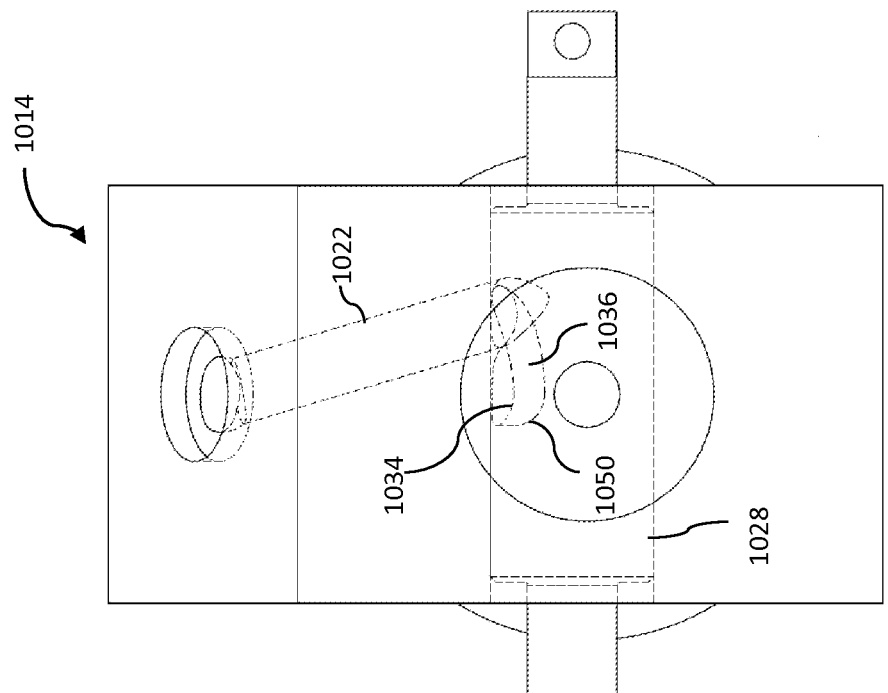
FIG. 10B is a front view of the valve assembly of FIG. 10A, with the internal features shown in dotted line.
Figure 10D:
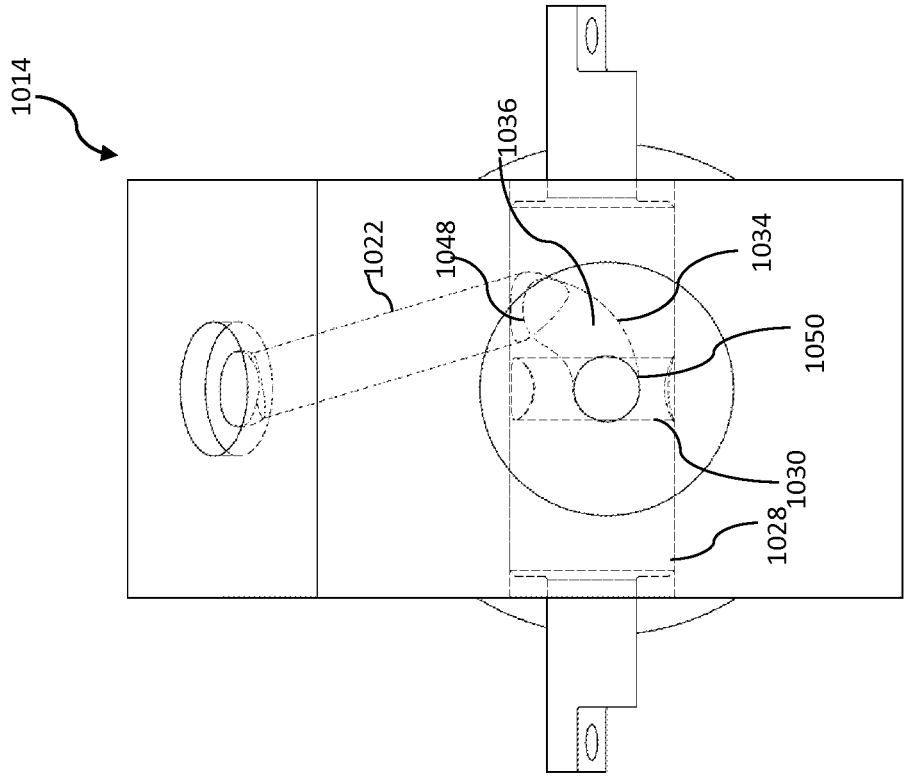
FIG. 10D is a front view of the valve assembly of FIG. 100, with the internal features shown in dotted line.
Figure 11C:
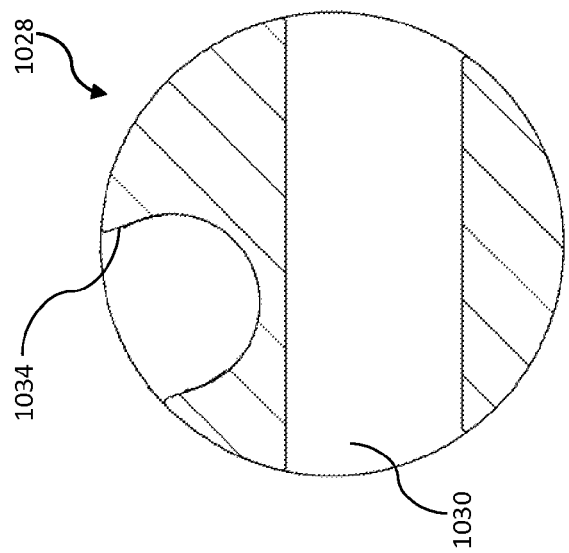
FIG. 11C is a cross-sectional view taken along line 11C-11C in FIG. 11B.
Figure 11B:
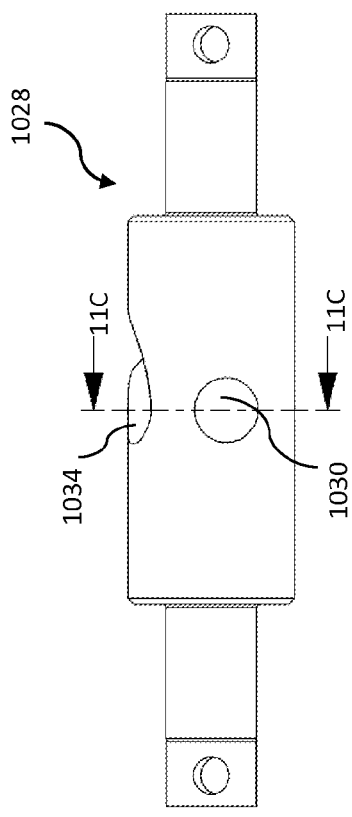
FIG. 11B is a front elevation view of the closure member of FIGS. 10A to 10D.
Figure 11A:
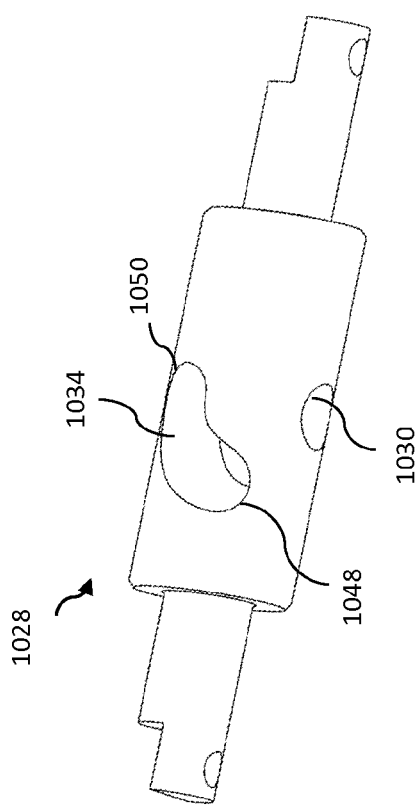
FIG. 11A is a perspective view of the closure member of FIGS. 10A to 10D.

Referring now to FIGS. 10A to 11C, an alternate exemplary valve assembly 1014 is shown, in which similar features to the valve assembly 114 are identified by like reference characters, incremented by 900. Referring to FIGS. 11A to 11C, the valve assembly 1014 includes an alternate rotary spool 1028, which has an alternate notch 1034. The notch 1034 has a first end 1048 (also referred to as an inlet end 1048) that is axially offset from the bore 1030, and a second end 1050 (also referred to as an outlet end 1050) that is axially aligned with the bore 1030. In the example shown, the notch 1034 is generally curved between the first end 1048 and the second end 1050. In alternate examples the notch may be straight, and may, for example, have a notch centerline that is positioned diagonally with respect to the valve axis.

Referring to FIGS. 10A and 10B, when the rotary spool 1028 is in the first position, the bore 1030 alone provides fluid communication between the shooting pot and the nozzle conduit, via the first port 1020 and the third port 1024. Referring to FIGS. 10C and 10D, when the rotary spool 1028 is in the second position, the gap 1036 provides fluid communication between the plasticizing barrel and the shooting pot, via the second port 1022 and the third port 1024.

Figure 12:
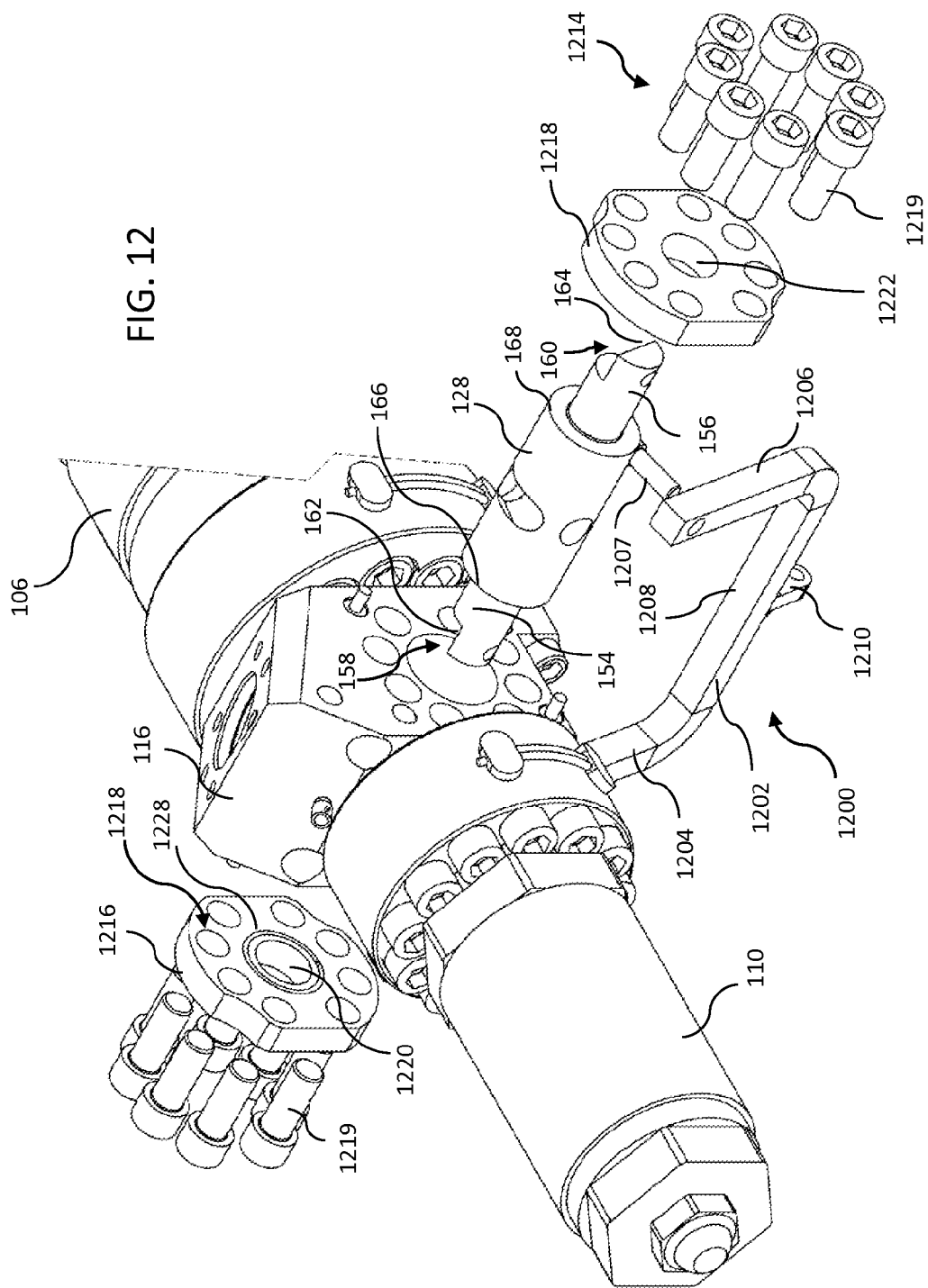
FIG. 12 is an exploded partial perspective view of the injection unit of FIG. 1, showing a valve actuation assembly and a retainer.

In use, the valve assemblies described above (or hereinafter) may be actuated by a valve actuation assembly. Referring to FIG. 12, a first example of a valve actuation assembly 1200 is shown. The valve actuation assembly 1200 is operable to cause rotation of the rotary spool 128 within the valve housing 116 about the valve axis, to move the rotary spool 128 between the first position and the second position. In FIG. 12, the valve actuation assembly 1200 is shown with the valve assembly 114 of FIGS. 1 to 4; however the valve actuation assembly 1200 may be used with any of the valve assemblies described herein, or with other valve assemblies.

Referring still to FIG. 12, in the example shown, the rotary spool 128 includes first and second attachment arms 154, 156, respectively, extending from opposed ends thereof along the valve axis. Each attachment arm 154, 156 is generally cylindrical, and includes a cutout 158, 160, respectively. Each cutout 158, 160 defines an axial abutment surface 162, 164 respectively. The valve actuation assembly includes a yoke 1202, including a pair of yoke arms 1204, 1206. The yoke arms 1204, 1206, fit into the cutouts 158, 160, respectively, and abut the axial abutment surfaces 162, 164, respectively. The yoke arms 1204, 1206 may be secured to the axial abutment surfaces 162, 164 respectively, by a fastener such as a bolt 1207.

Referring still to FIG. 12, in the example shown, the yoke 1202 includes a base 1208 joining the arms 1204, 1206, and a strut 1210 extending downwardly from the base 1208. The strut 1210 is connected to an actuator 1212, such as a fluid cylinder (shown in FIG. 1). When the actuator 1212 is extended, as shown in FIG. 1, the strut 1210 is advanced to cause rotation of the yoke 1202 about the valve axis in a first direction, which in turn causes rotation of the rotary spool 128 to the first position. When the actuator 1212 is retracted, the strut 1210 is pulled back to cause rotation of the yoke 1202 about the valve axis in a second direction, which in turn causes rotation of the rotary spool 128 to the second position.

The rotary spools described above may be retained in the valve housing by a retainer, which may prevent or inhibit movement of the rotary spools along the valve axis. Referring still to FIG. 12, a first example of a retainer 1214 is shown. In FIG. 12, the retainer 1214 is shown with the valve assembly 114 of FIGS. 1 to 4; however the retainer 1214 may be used with any of the valve assemblies described herein, or with other valve assemblies.

Referring still to FIG. 12, in the example shown, the rotary spool 128 includes a pair of shoulders 166, 168 that are axially spaced apart. Each shoulder 166, 168 is generally flush with an outer surface of the valve housing 116 when the rotary spool 128 is positioned for use within the valve housing 116. The retainer 1214 includes a pair of plates 1216, 1218, positionable on opposed sides of the valve housing 116 adjacent the rotary spool 128, and secured to the valve housing 116 by a plurality of bolts 1219 (only two of the bolts are labeled in FIG. 12). Each plate 1216, 1218 includes an aperture 1220, 1222, respectively, through which the attachment arms 154, 156 of the rotary spool 128 extend, respectively. A first annular portion 1228 of the first plate 1216 faces the shoulder 166 and may abut the shoulder 166. A second annular portion of the second plate 1218 faces the shoulder 168, and may abut the shoulder 168. By facing and optionally abutting the shoulders 166, 168 the plates 1216, 1218 can prevent or inhibit translation of the rotary spool 128 along the valve axis 129.

Referring now to FIGS. 13 to 16, an alternate example of a retainer is shown, in which similar features to the retainer of FIG. 12 are identified by like reference numerals incremented by 100.

Figure 13:
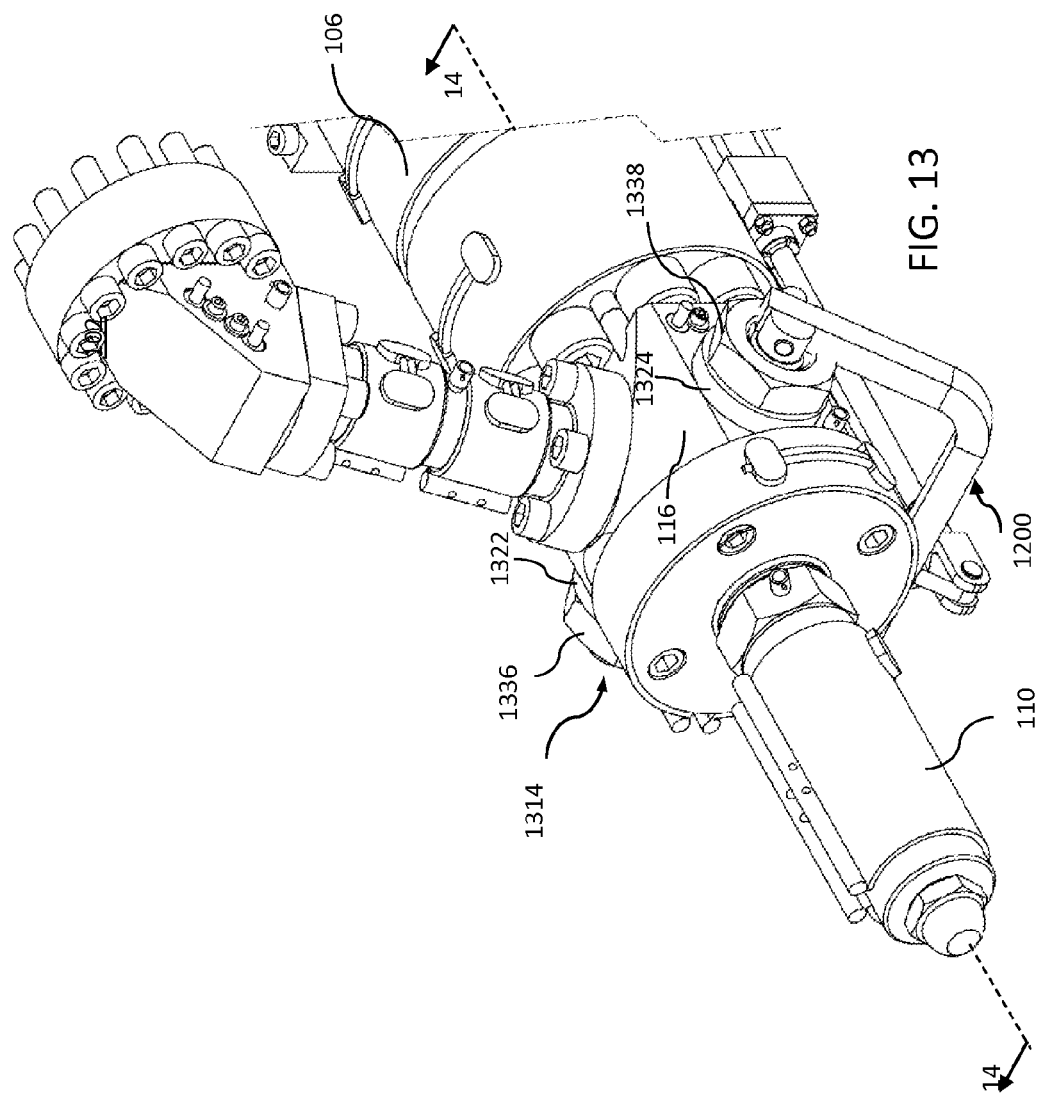
FIG. 13 is a partial perspective view of an alternate injection unit, showing an alternate retainer.
Figure 14:
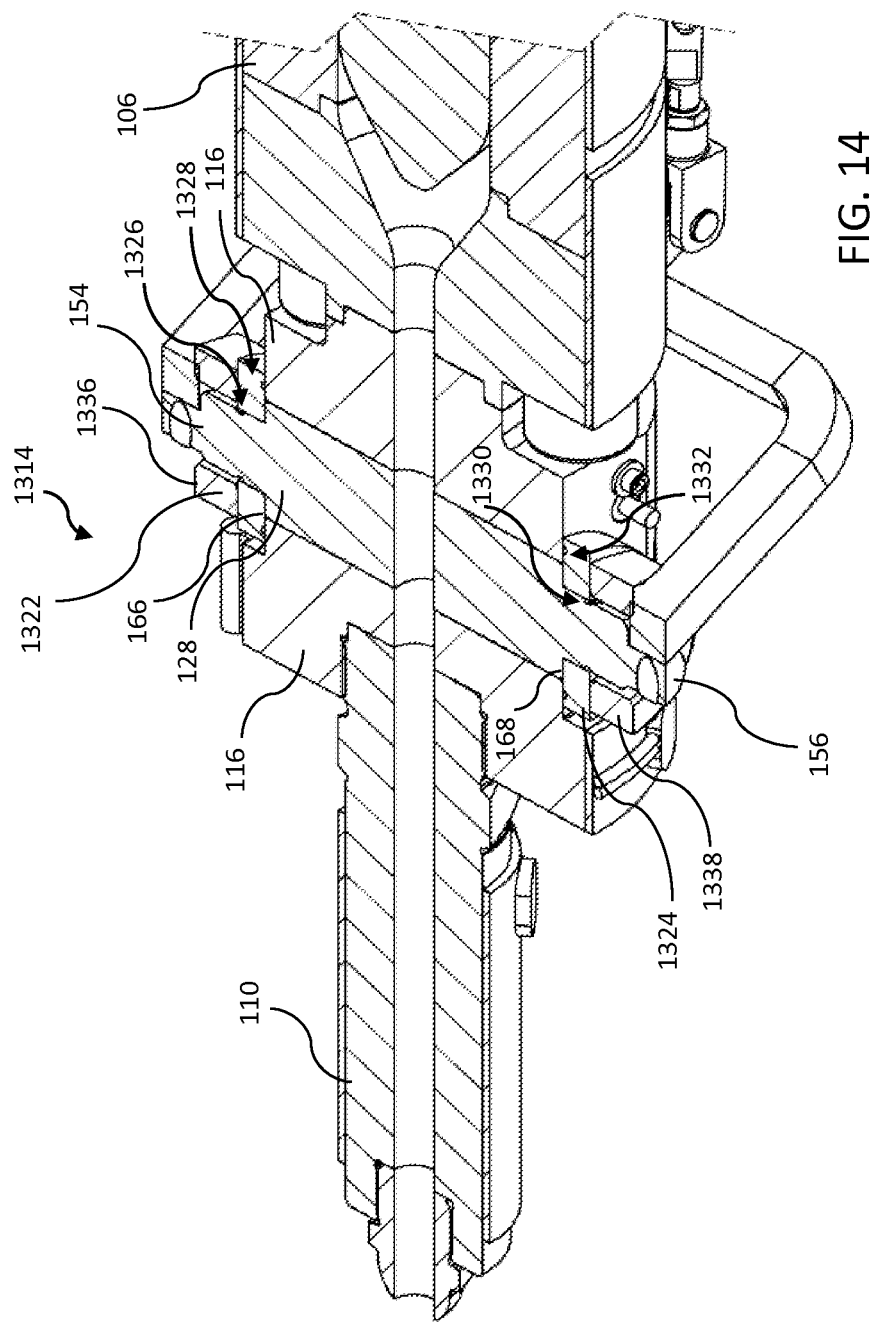
FIG. 14 is a cross-sectional view taken along line 14-14 in FIG. 13.

Referring to FIGS. 13 and 14, the retainer 1314 includes a pair of disks 1322, 1324, which fit on the attachment arms 154, 156, respectively, of the rotary spool 128. The disks 1322, 1324 have a diameter greater than the shoulders 166, 168, so that a first annular portion 1326 of the disk 1322 faces and abuts the shoulder 166, and a second annular portion 1328 of the disk 1322 faces and abuts the valve housing 116. Similarly, a first annular portion 1330 of the disk 1324 faces and abuts the shoulders 168, and a second annular portion 1332 of the disk 1324 faces and abuts the valve housing 116.

Figure 15:
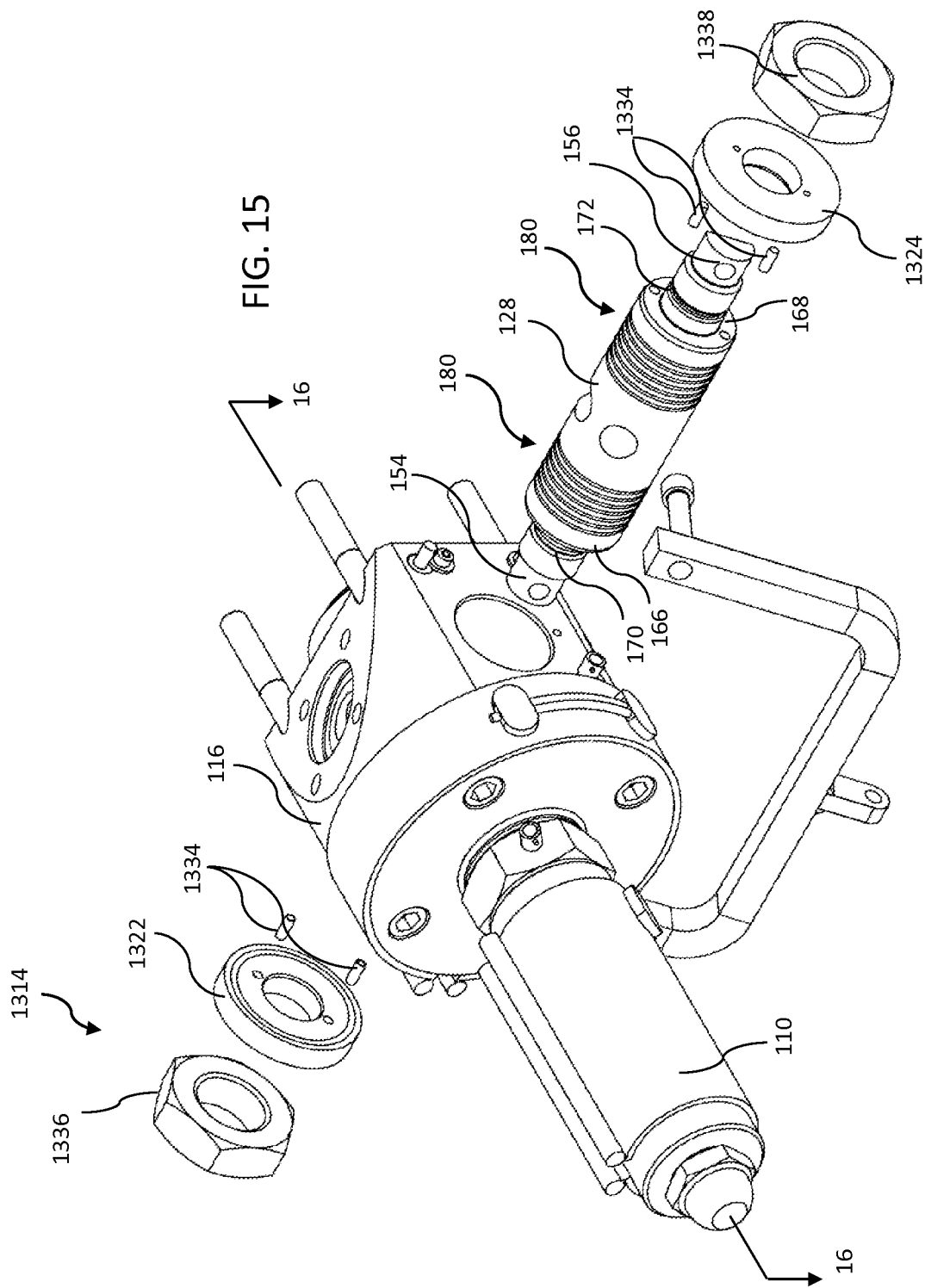
FIG. 15 is an exploded perspective view of the valve assembly, nozzle, retainer, and valve actuation assembly of FIG. 13.
Figure 16:
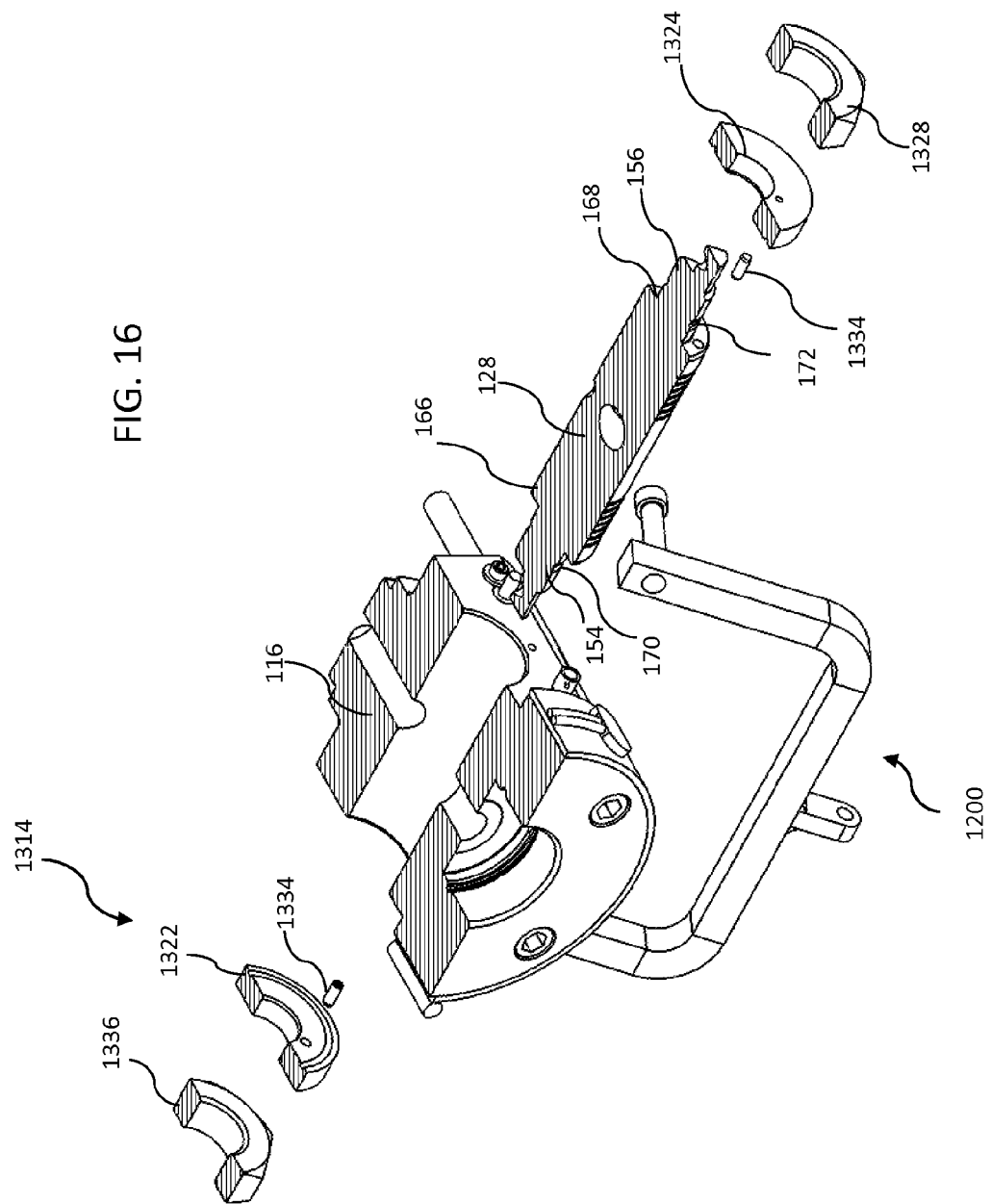
FIG. 16 is a cross-sectional view taken along line 16-16 in FIG. 15.

Referring to FIGS. 15 and 16, in the example shown, pins 1334 are provided in order to prevent or inhibit rotation of the disks 1322, 1324, with respect to the rotary spool 128. Each pin 1334 extends along the valve axis and has a first end that is inserted into the rotary spool 128, and a second end that is inserted into one of the disks 1322, 1324.

Referring still to FIGS. 15 and 16, each attachment arm 154, 156 includes a threaded portion 170, 172 respectively. The retainer 1314 includes a pair of nuts 1336, 1338 which are threaded onto the threaded portions 170, 172, respectively. The nuts 1336, 1338 secure the disks 1322, 1324 in a generally fixed axial position with respect to the rotary spool 128. As the disks 1322, 1324 abut the valve housing 116 and are in a generally fixed axial position with respect to the rotary spool 128, movement of the rotary spool 128 along the valve axis 129 may be generally prevented or inhibited.

Figure 17:
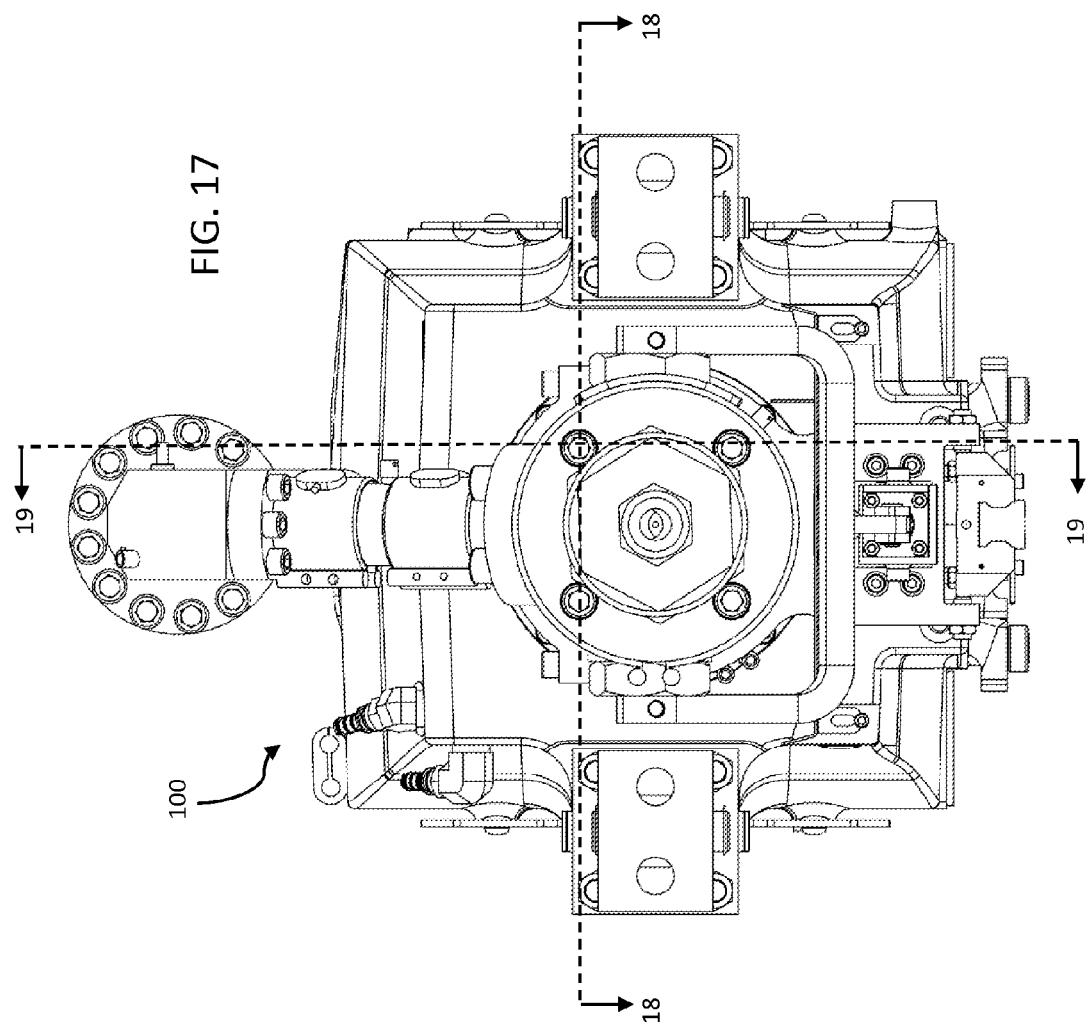
FIG. 17 is a partial front view of an injection unit including the retainer of FIGS. 13 to 16.

Referring now to FIGS. 17 to 19 the valve housing 116 may optionally be secured to the plunger apparatus 106 by a plurality of bolts 174 which extend through the valve housing and into the plunger apparatus.

In any of the above examples, the rotary spool may include one or more seal journals. An example set of seal journals 180 is shown in FIG. 15.

Figure 20:
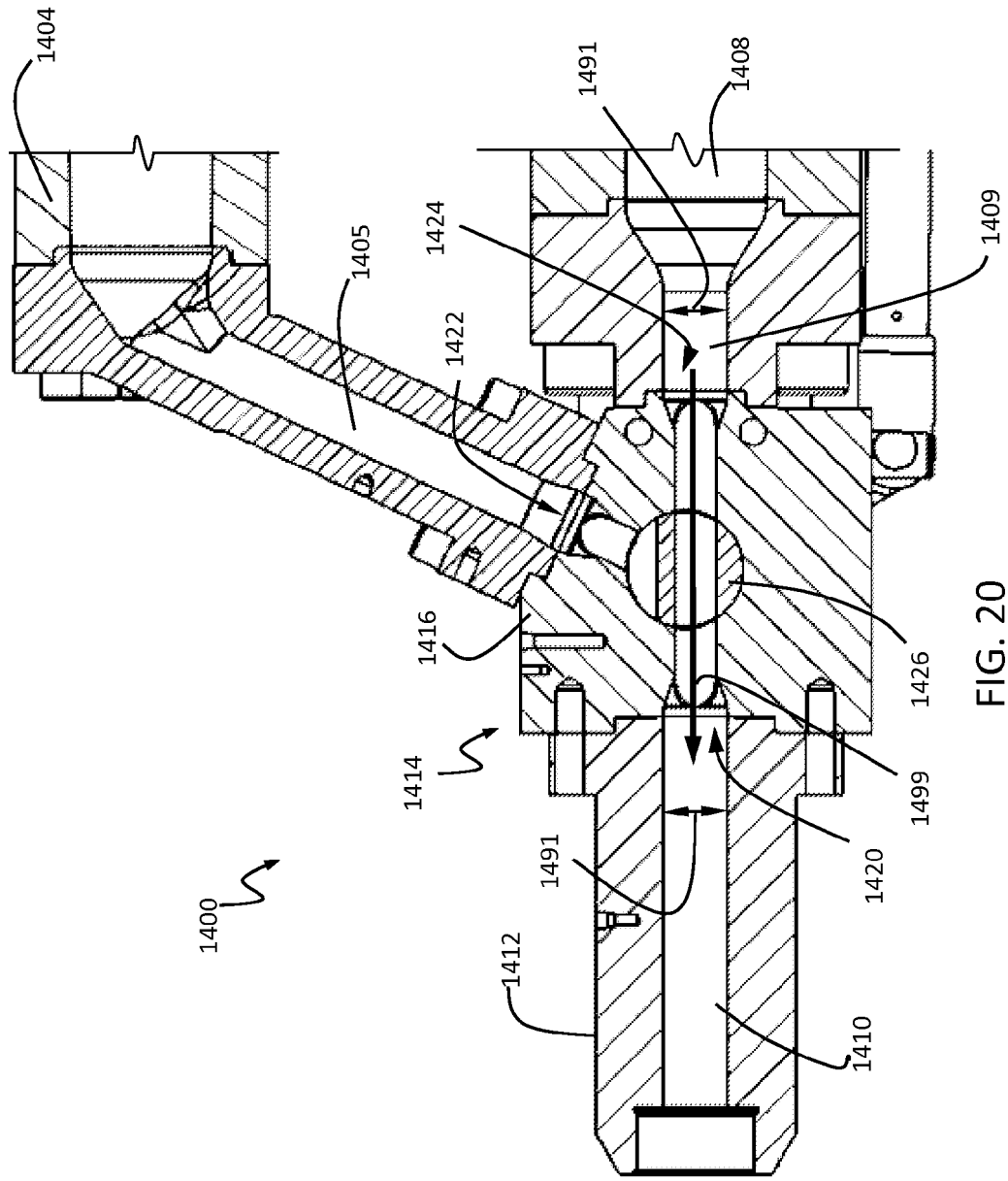
FIG. 20 is a cross-sectional view of a portion of another injection unit showing a closure member in a first position.

Referring to FIG. 20, a portion of another example of an injection unit 1400 is shown. The injection unit 1400 has similarities to the injection unit 100, and like features are identified by like reference characters, incremented by 1300.

The injection unit 1400 includes a plasticizing apparatus having a plasticizing barrel 1404 for producing melt from which molded articles are to be formed, a nozzle 1412 for dispensing melt to a mold, and a plunger apparatus having a shooting pot 1408 for alternately receiving the melt from the plasticizing apparatus and delivering the melt to the nozzle 1412.

In the example illustrated, the injection unit 1400 further includes a valve assembly 1414 that includes a valve housing 1416. The valve housing 1416 has an inner surface 1417 defining a valve seat (see also FIG. 24), and an outer surface 1418. A valve closure member 1426 is movably mounted in the valve seat for controlling the flow of melt through the valve assembly. The valve housing 1416 has a first port 1420 in fluid communication with the nozzle 1412 (independently of the position of the closure member 1426), and a second port 1422 and a third port 1424 each spaced apart from the first port 1420. In the example illustrated, the plasticizing barrel 1404 is in fluid communication with the second port 1422, and the shooting pot 1408 is in fluid communication with the third port 1424 (each independently of the position of the closure member 1426).

Figure 21:
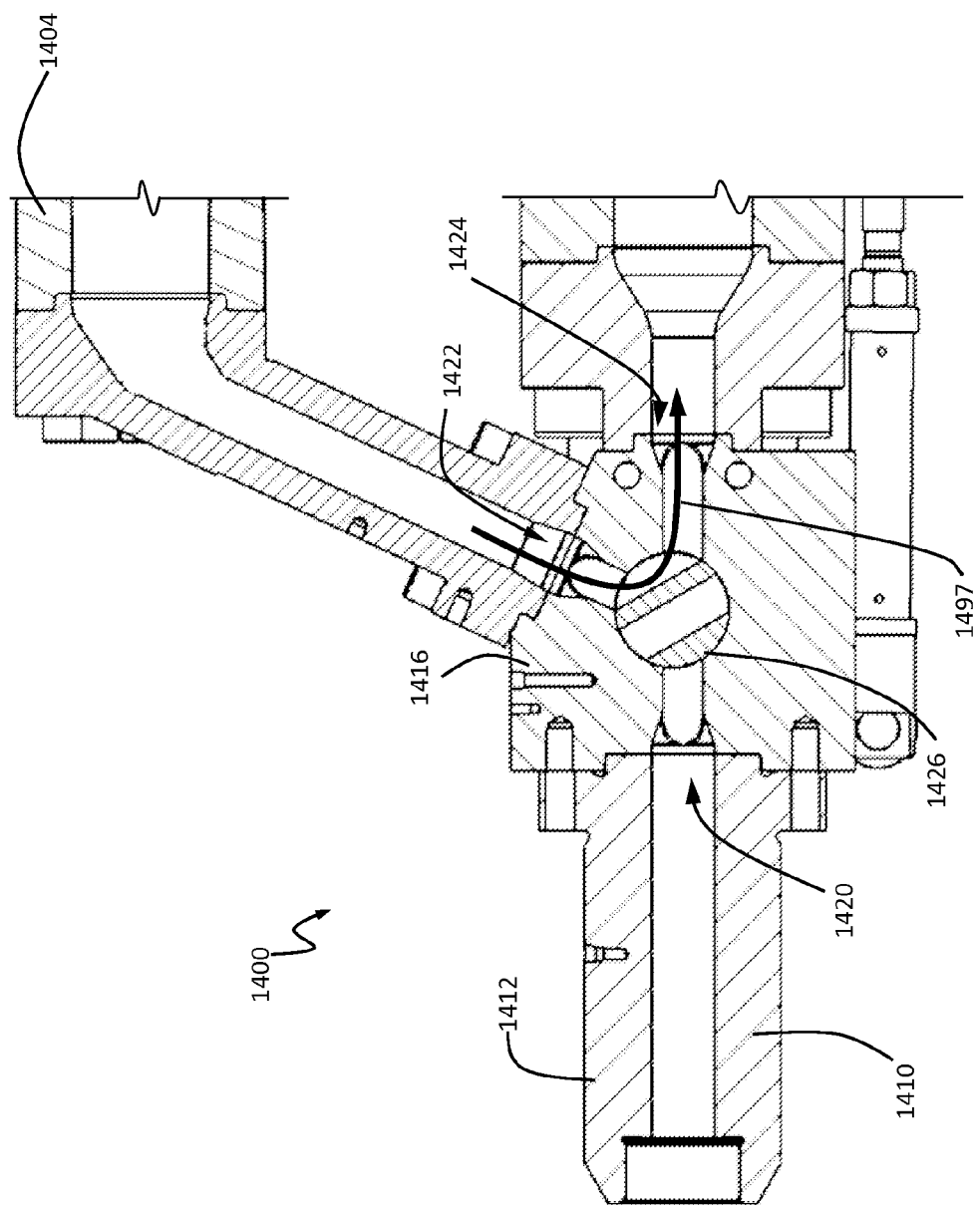
FIG. 21 is a similar view as FIG. 20, but showing the closure member in a second position.

In use, the valve closure member 1426 can be moved to the second position and melt can pushed from the barrel 1404 into the second port 1422, through the notch in the closure member, and out the third port 1424 (along flow path marked by arrow 1497 in FIG. 21). This flow continues until the desired amount of melt has been collected in the shooting pot 1408. When the valve closure member 1426 is moved to the first positon (FIG. 20), the melt can be displaced from the shooting pot towards the nozzle 1412 through the third port 1424, the cross-bore 1430 of the closure member 1426, and out the first port 1420 along the flow path identified by arrow 1499 in FIG. 20.

In the example illustrated, flow communication between the first port 1420 and the nozzle 1412 is facilitated by a nozzle conduit 1410, flow communication between the second port 1422 and the barrel 1404 is facilitated by a barrel conduit 1405, and flow communication between the third port 1424 and the shooting pot 1408 is facilitated by a shooting pot conduit 1409.

The valve closure member 1426 includes a cross-bore 1430 extending through the valve closure member and a surface notch 1434 enclosed at least in part by the inner surface of the housing. In the example illustrated, the surface notch 1434 is in fluid isolation from the cross-bore 1430. The valve closure member 1426 is movable between a first position (FIGS. 20 and 22) in which the first port 1420 is in fluid communication with the third port 1424 via the cross-bore 1430 and in which the second port 1422 is in fluid isolation of the first and third ports, and a second position (FIGS. 21 and 23) in which the second port 1422 is in fluid communication with the third port 1424 via the surface notch 1434 and the first port 1420 is in fluid isolation of the second and third ports.

Figure 26:
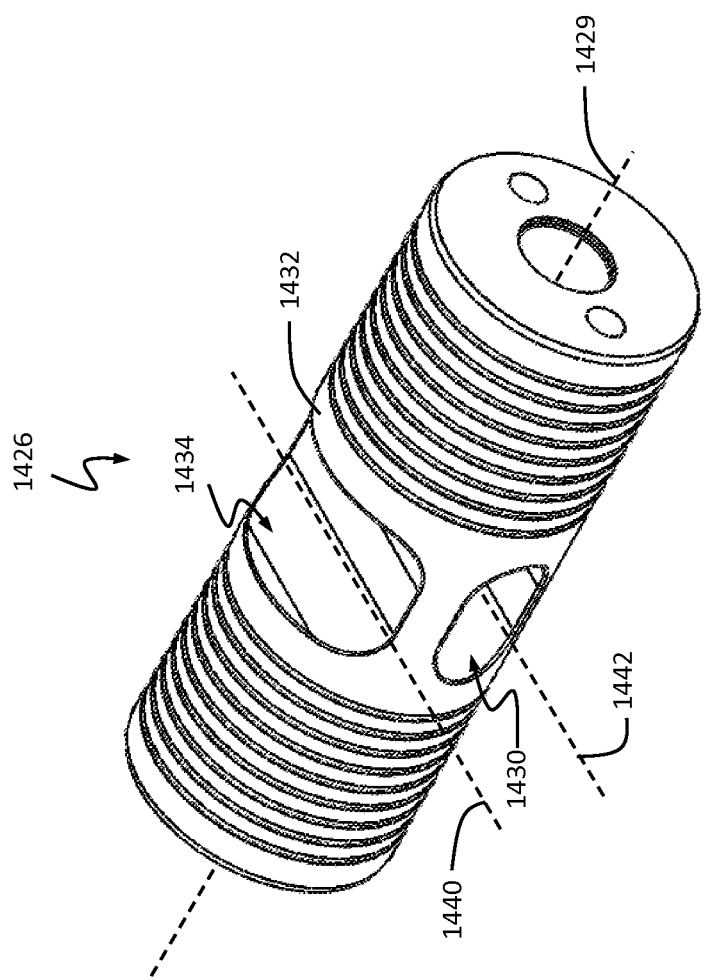
FIG. 26 is a perspective view of the closure member of the injection unit of FIG. 20.

In the example illustrated, the valve closure member 1426 has a generally cylindrical body (or spool) 1428 with a generally cylindrical outer surface 1432 disposed about a valve axis 1429 (see also FIG. 26). The closure member 1426 is, in the example illustrated, rotatable about the valve axis 1429 between the first position and the second position. The valve closure member 1426 can be made from a material selected from AISI group H Chromium Hot-worked steels, Group M (Molybdenum), Group T (Tungsten) high speed steels or Group D High chromium cold worked steels.

In the example illustrated, the cross-bore 1430 extends linearly along a cross-bore centerline 1442 and has a rounded rectangular cross-bore profile in cross-section that generally encloses the cross-bore 1430 about the cross-bore centerline 1442. The term "rounded rectangular" includes a rectangle with opposed parallel sides and rounded corners, and a "race'track" shape with only one set of opposed parallel sides, and also oval-like shapes which may have not parallel sides. By configuring the cross-bore 1430 to have a rounded rectangular profile (instead of, for example, a circular profile as shown in the cross-bore 130), the flow capacity through the cross-bore can be increased without increasing the diameter of the closure member. The surface notch 1434 can have a similar profile (but with an open top) to provide a U-shaped profile with a similar cross-sectional area as the cross-bore, and extending linearly along a surface notch centerline 1440.

The cross-bore centerline 1442 and notch centerline 1440 can be aligned axially along the valve axis 1429 (left-to-right in FIG. 27). This can help to shorten the axial extent of the closure member 1426 while maintaining sufficient axial extent (for adequate sealing functionality) of the cylindrical portions extending axially outward from the central portion in which the cross-bore 1430 and surface notch 1434 are disposed. In this configuration, inner ends of the ports 1420, 1422, and 1424 would also be disposed in alignment with the central portion of the closure member 1426.

In the example illustrated, the cross-bore centerline 1442 is orthogonally offset from the valve axis 1429 (in an up-and-down direction in FIGS. 27 and 28) by a cross-bore offset 1444. Providing a cross-bore offset 1444 can facilitate accommodating the desired cross-sectional area of both the cross-bore 1430 and surface notch 1434 within a compact spool diameter. The ratio of the cross-bore offset 1444 to the spool diameter 1490 can be in the range from about 0.05 to about 0.15, and in the example illustrated is in the range from about 0.07 to about 0.10.

In the example illustrated, the cross-bore profile of the cross-bore 1430 has first and second opposed cross-bore lateral side surfaces 1482a, 1482b that are spaced apart from each other along the valve axis 1429 and disposed on opposite sides of the cross-bore centerline 1442. The spacing between the cross-bore lateral side surfaces defines a major width 1484 of the cross-bore profile.

The cross-bore profile has first and second opposed cross-bore axial surfaces 1486a, 1486b extending in a direction generally parallel to the valve axis 1429 and spaced apart from each other on opposite sides of the cross-bore centerline 1442. The spacing between the cross-bore axial surfaces defines a minor width 1488 of the cross-bore profile. In general, the minor width 1488 can be less than the major width 1484.

In the example illustrated, the cross-bore lateral surfaces 1482a and 1482b are generally semi-circular in shape, having a radius generally equal to half the minor width 1488 of the cross-bore 1430. The cross-bore axial surfaces 1486a, 1486b each comprise, in the example illustrated, a generally planar surface extending between and connecting together the lateral side surfaces 1482a and 1482b.

According to some examples, the cross-bore and surface notch can be configured to provide a high flow rate capacity of melt through the valve and yet keep the valve compact in size. Furthermore, the inventors have discovered that the relative size and shape of the cross-bore 1430 and surface notch 1434 can impact satisfactory melt flow through the valve assembly 1414 in ways beyond flow capacity. For example, differences in the configuration of the cross-bore 1430 and surface notch 1434 can result in different shear forces in the melt, and can generate different lateral loads on the closure member 1426 which can impact operation of the valve assembly.

The valve closure member 1426 can have a spool diameter 1490, and the ratio of the minor width 1488 to the spool diameter 1490 can be in the range from about 0.25 to about 0.5. In the example illustrated, the ratio of the minor width 1488 to the spool diameter 1490 is in the range from about 0.3 to about 0.35.

Additionally, in some examples the ratio of the minor width 1488 to the major width 1484 can be in the range from about 0.3 to about 0.9, and in the example illustrated is in the range of about 0.55 to about 0.65.

In the example illustrated, the surface notch 1434 is generally defined by a cut-out in the outer surface 1432 of the closure member. A peripheral portion of the outer surface 1432 disposed about a periphery of the surface notch provides a seal surface engageable by the inner surface 1417 of the valve housing to provide a seal about the surface notch 1434 at least when the closure member 1426 is in the second position.

Referring again to FIG. 27, in the example illustrated, the surface notch 1434 has a U-shaped profile, defining a recessed surface 1435 that includes a notch bottom surface 1435*d* and opposed first and second notch sides 1435*e* and 1435*f*, respectively, extending downwardly from respective edges 1434*b*, 1434*c* to the notch bottom surface 1435*d*. The notch 1434 has opposed end edges 1435*a* and 1435*b*. The notch sides 1435*e* and 1435*f* are spaced apart from each other axially (along the valve axis 1429) by an amount defining a notch width 1434*a*. The surface notch 1434 has a notch depth 1437 (FIG. 28). In the example illustrated, the notch width 1434*a* is generally equal to, and axially aligned with, the cross-bore major width 1484. The notch depth 1437 can generally be between about 50 percent and 95 percent of the cross-bore minor width 1488.

The notch bottom surface 1435*d* is, in the example illustrated, generally planar and parallel to the first cross-bore axial surface 1486*a*. The body material (of the closure member 1426) between the notch bottom surface 1435*d* and the first cross-bore axial surface 1486*a* defines an internal wall 1439 having a wall thickness 1439*a*. The internal wall 1439 separates the cross-bore 1430 from the notch 1434. The internal wall can also help to strengthen the valve closure member 1426, which can help the valve closure member 1426 withstand high pressure associated with melt passing through the cross-bore 1430 when the valve closure member 1426 is in the first position when injecting melt through the nozzle 1412 and into a mold.

An outer wall 1446 of the closure member 1426 is disposed on the side of the cross-bore 1430 adjacent the second cross-bore axial surface 1486*b* and opposite the internal wall 1439. In the example illustrated, the outer wall 1446 generally has the form of a segment of a cylinder, extending axially along the major width 1484 of the cross-bore 1430, and having an outer wall thickness 1447. Like the internal wall 1439, the external wall 1446 can help strengthen the valve closure member 1426.

The ratio of the thickness 1439*a* of the inner wall to the spool diameter 1490 is the range from about 0.1 to about 0.2, and in the example illustrated is from about 0.15 to about 0.17. The ratio of the thickness 1447 of the outer wall to the spool diameter 1490 is in the range from about 0.2 to about 0.25, and in the example illustrated is about 0.23.

Referring to FIGS. 24 and 25, each of the first port 1420 and third port 1424 has a respective inner port end 1420*a*, 1424*a* adjacent the inner surface 1417 of the housing 1416. Each inner port end 1420*a*, 1424*a* has a rounded rectangular inner port profile in cross-section matching the profile of the cross-bore 1430. In the example illustrated, the rounded rectangular inner port profile has a minor inner port width 1493*a* and a major inner port width 1493*b* (FIG. 25).

The nozzle conduit 1410 and the shooting pot conduit 1409 each have, at least adjacent the first port 1420 and third port 1424, respectively, a circular conduit profile in cross-section having a conduit profile diameter 1491 (FIG. 20). Each of the first port 1420 and third port 1424 have an outer port end 1420*b*, 1424*b* adjacent the outer surface of the housing (FIG. 24), each outer port end 1420*b*, 1424*b* having a circular outer port profile in cross-section matching the circular conduit profile. In the example illustrated, the circular outer port profile has a port diameter 1492 generally equal to the conduit diameter 1491.

In the example illustrated, the circular outer port profile has a port profile diameter 1492 generally equal to the major width 1484 of the rounded rectangular profile of the cross-bore 1430, and generally equal to the major inner port width 1493*b*. Each port 1420, 1424 can have a transition area between the inner port end 1420*a*, 1424*a* and the respective outer port end 1420*b*, 1424*b*. The transition area can include a generally conical surface 1494 having a larger transition diameter adjacent the outer port end 1420*b*, 1424*b*, and a smaller transition diameter spaced apart from the larger diameter towards the inner port end 1420*a*, 1424*a*. The larger transition diameter is, in the example illustrated, generally equal to the port profile diameter 1492, and the smaller transition diameter is generally equal to the minor width 1488 of the rounded rectangle profile of the cross-bore, and generally equal to the minor inner port width 1493*a* of the rounded rectangular port profile.

The second port 1422 can similarly have a respective outer port end 1422*b* having a circular outer port profile in cross-section matching the circular conduit profile of the barrel conduit, and a respective inner port end having a rounded rectangular inner port profile in cross-section matching the profile of the cross-bore 1430.

While the above description provides examples of one or more processes or apparatuses, it will be appreciated that other processes or apparatuses may be within the scope of the accompanying claims.

The invention claimed is:

1. An injection unit for an injection molding machine, comprising:
   a) a nozzle for dispensing melt to a mold;
   b) a valve housing having in inner surface defining a valve seat, a first port in fluid communication with the nozzle, and a second port and a third port each spaced apart from the first port;
   c) a plasticizing barrel in fluid communication with the second port;
   d) a shooting pot in fluid communication with the third port; and
   e) a valve closure member mounted in the valve seat, the valve closure member including a cross-bore extending through the valve closure member and a surface notch enclosed at least in part by the inner surface of the housing, the surface notch in fluid isolation from the cross-bore,
   the valve closure member moveable between a first position in which the first port is in fluid communication with the third port via the cross-bore and in which the second port is in fluid isolation of the first and third ports, and a second position in which the second port is in fluid communication with the third port via the surface notch and the first port is in fluid isolation of the second and third ports.

2. The injection unit of claim 1, wherein the valve closure member comprises a generally cylindrical outer surface disposed about a valve axis and the surface notch is disposed in the outer surface.

3. The injection unit of claim 2, wherein the closure member is rotatable about the valve axis to move the closure member between the first position and the second position.

4. The injection unit of claim 2, wherein an outer periphery of the closure member provides a seal surface around an entire periphery of the surface notch.

5. The injection unit of claim 2, wherein the cross-bore has opposed ends opening to the cylindrical outer surface of the valve closure member.

6. The injection unit of claim 5, wherein the cross-bore extends linearly between the opposed ends along a cross-bore centerline, the cross-bore centerline offset from the valve axis in a direction orthogonal to the valve axis by a cross-bore offset.

7. The injection unit of claim 6, wherein the outer surface of the closure member defines a spool diameter, and the ratio of the cross-bore offset to the spool diameter is in the range from about 0.05 to about 0.15.

8. The injection unit of claim 6, wherein the outer surface of the closure member defines a spool diameter, and the ratio of the cross-bore offset to the spool diameter is in the range from about 0.07 to about 0.10.

9. The injection unit of claim 5, wherein the surface notch has a notch centerline, and the cross-bore centerline and notch centerline are aligned in a common plane perpendicular to the valve axis.

10. The injection unit of claim 2, wherein the second port and the third port are open to the inner surface of the valve housing, and are spaced circumferentially apart about the inner surface by a circumferential port spacing, and wherein the notch has a circumferential extent measured about the valve axis that is generally equal to or greater than the circumferential port spacing.

11. The injection unit of claim 10, wherein the first, second, and third ports have respective first, second, and third port centerlines that are aligned in a common plane perpendicular to the valve axis, and the surface notch extends linearly along a notch centerline that is aligned in the common plane.

12. The injection unit of claim 10, wherein the cross-bore has a cross-bore centerline and the notch has a notch centerline, and the cross-bore centerline and the notch centerline are aligned in respective first and second planes perpendicular to the valve axis, the first and second planes spaced apart from each other along the valve axis.

13. The injection unit of claim 2, wherein the cross-bore extends linearly along a cross-bore centerline and has a rounded rectangular cross-bore profile in cross-section, the cross-bore profile generally enclosing the cross-bore about the cross-bore centerline, the cross-bore profile having a major width extending between opposed cross-bore lateral surfaces spaced apart from each other along the valve axis and on opposite sides of the cross-bore centerline, and a minor width extending between opposed cross-bore axial surfaces extending in a direction generally parallel to the valve axis and spaced apart from each other on opposite sides of the cross-bore centerline.

14. The injection unit of claim 13, wherein the ratio of the minor width to the major width is in the range from about 0.3 to about 0.9.

15. The injection unit of claim 13, wherein the ratio of the minor width to the major width is in the range from about 0.55 to about 0.65.

16. The injection unit of claim 13, wherein the surface notch has a U-shaped profile having a notch width extending along the valve axis between spaced apart notch sides, and a notch depth extending inwardly of the outer surface to a notch bottom surface, wherein the notch width is generally equal to, and axially aligned with, the cross-bore major width.

17. The injection unit of claim 16, wherein the notch depth is generally between about 50 percent and 95 percent of the cross-bore minor width.

18. An injection unit for an injection molding machine, comprising:
 a) a nozzle for dispensing melt to a mold;
 b) a valve housing having an outer housing surface and an inner housing surface defining a valve seat, a first port in fluid communication with the nozzle, and a second port and a third port each spaced apart from the first port;
 c) a plasticizing barrel in fluid communication with the second port;
 d) a shooting pot in fluid communication with the third port; and
 e) a valve closure member mounted in the valve seat, the valve closure member movable relative to the valve seat between a first position and at least a second position, the valve closure member including a cross-bore extending through the valve closure member along a bore axis for providing fluid communication between the first port and the third port when the closure member is in the first position, the cross-bore having a rounded rectangular profile in cross-section.

19. The injection unit of claim 18, wherein each of the first port and third port has an inner port end adjacent the inner surface of the housing, each inner port end having a rounded rectangular profile in cross-section matching the profile of the cross-bore.

20. The injection unit of claim 19, wherein the nozzle has a nozzle conduit and the shooting pot has a shooting pot conduit, each conduit having a circular conduit profile in cross-section at least adjacent the first port and third port, respectively, and each of the first port and third port having an outer port end adjacent the outer surface of the housing, each outer port end having a circular port profile in cross-section matching the conduit profile.

21. The injection unit of claim 20, wherein the circular port profile has a diameter generally equal to the major width dimension of the rounded rectangle profile of the cross-bore.

22. The injection unit of claim 2, wherein the outer surface of the valve closure member comprises an axially central portion disposed between axially spaced apart end portions, the surface notch disposed in the central portion, and at least one seal journal disposed in each of the end portions.

23. The injection unit of claim 18, wherein the first and third ports are spaced about 180 degrees apart from each other about the valve seat.

24. The injection unit of claim 23, wherein a straight flow path is provided between the shooting pot and the nozzle via the cross-bore when the closure member is in the first position.

25. The injection unit of claim 24, wherein the closure member further comprises a surface notch for providing fluid communication between the second port and the third port when the closure member is in the second position.

26. The injection unit of claim 25, wherein the closure member is rotatable between the first and second positions about a valve axis, the valve axis generally perpendicular to the bore axis, and the bore axis offset from the valve axis in a direction orthogonal to the bore axis and valve axis by a distance defining a cross-bore offset.

* * * * *